United States Patent
Saleh et al.

(10) Patent No.: US 12,157,854 B2
(45) Date of Patent: *Dec. 3, 2024

(54) MODIFIED BENTONITE DRILLING FLUID COMPOSITION

(71) Applicant: KING FAHD UNIVERSITY OF PETROLEUM AND MINERALS, Dhahran (SA)

(72) Inventors: Tawfik Abdo Saleh, Dhahran (SA); Azeem Rana, Dhahran (SA); Mobeen Murtaza, Dhahran (SA); Muhammad Shahzad Kamal, Dhahran (SA); Mohamed Mahmoud, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/616,673

(22) Filed: Mar. 26, 2024

(65) Prior Publication Data

US 2024/0301270 A1    Sep. 12, 2024

Related U.S. Application Data

(63) Continuation of application No. 18/181,711, filed on Mar. 10, 2023.

(51) Int. Cl.
C09K 8/02 (2006.01)
C09K 8/20 (2006.01)

(52) U.S. Cl.
CPC .......... C09K 8/206 (2013.01); *C09K 2208/12* (2013.01)

(58) Field of Classification Search
CPC ....... C09K 8/206; C09K 2208/12; C09K 8/02
See application file for complete search history.

(56) References Cited

U.S. PATENT DOCUMENTS

| 2017/0058180 A1 | 3/2017 | Hossain et al. |
| 2019/0194519 A1 | 6/2019 | Amanullah |
| 2019/0233706 A1* | 8/2019 | Adewole .................. C09K 8/08 |
| 2021/0002537 A1 | 1/2021 | Amanullah |

FOREIGN PATENT DOCUMENTS

EP    3 286 280 81    8/2020

OTHER PUBLICATIONS

Al-Hameedi (A. T. Al-Hameedi et al., Experimental investigation of bio-enhancer drilling fluid additive: Can palm tree leaves be utilized as supportive eco-friendly additive in water-based drilling fluid system?, Journal of Petroleum Exploration and Production Technology, 2020, 10, 595-603).*
Adewole, et al. : A Study on the Effects of Date Pit-Based Additive on the Performance of Water-Based Drilling Fluid ; J. Energy Resourc. Technol. 140(5) : Nov. 28, 2017 ; 12 Pages ; Abstract Only.
Medved, et al. ; Green Approach in Water-Based Drilling Mud Design to Increase Wellbore Stability ; MDPI applied sciences : May 25, 2022 ; 19 Pages.

* cited by examiner

*Primary Examiner* — Kumar R Bhushan
(74) *Attorney, Agent, or Firm* — Oblon, McClelland, Maier & Neustadt, L.L.P.

(57) ABSTRACT

A drilling fluid composition includes an aqueous base fluid, 0.01 to 10 wt. % of a date palm leaves extract (DPLE), 1 to 10 wt. % of clay particles, and 0.01 to 1 wt. % of a base, where each wt. % based on a total weight of the drilling fluid composition. The DPLE is homogenously disposed on surfaces of the clay particles. The clay particles disposed with the DPLE are present in the drilling fluid composition in the form of a composite. A pellet made from the clay particles treated with the DPLE has a swelling value at least 75% less than a swelling value of the pellet in an aqueous composition that does not contain the DLPE. A method of making the drilling fluid composition.

17 Claims, 12 Drawing Sheets

MODIFIED BENTONITE DRILLING FLUID COMPOSITION

CROSS-REFERENCE TO RELATED APPLICATIONS

The present application is a Continuation of U.S. application Ser. No. 18/181,711, now allowed, having a filing date of Mar. 10, 2023.

STATEMENT REGARDING PRIOR DISCLOSURE BY THE INVENTORS

Aspects of this technology are described in "An efficient, cost-effective, and green natural extract in water-based drilling muds for clay swelling inhibition" published in Journal of Petroleum Science and Engineering, Volume 214, 110332, which is incorporated herein by reference in its entirety.

BACKGROUND

Technical Field

The present disclosure is directed to a water-based drilling fluid composition, particularly a date palm leaves extract-containing drilling fluid composition, for use as a shale inhibitor.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

The initial and most expensive step in the development of oil and gas wells is drilling the wellbore. This initial step poses challenges to wellbore stability. The drilling industry faces severe economic losses due to mechanical failure issues related to interactions between the drilling fluid and clay [Mahmoud, O., Mady, A., Dahab, A. S., Aftab, A., 2021. $Al_2O_3$ and CuO nanoparticles as promising additives to improve the properties of KCl-polymer mud: an experimental investigation. Can. J. Chem. Eng. 1; Moslemizadeh A, Shadizadeh S R. A natural dye in water-based drilling fluids: swelling inhibitive characteristic and side effects. Petroleum 2017; 3:355-66]. On one hand, such interactions could result in wellbore instability as a result of shale swelling due to different types of clay and clay minerals [Rana, A., Arfaj, M. K. M. K., Saleh, T. A. T. A., 2019. Advanced developments in shale inhibitors for oil production with low environmental footprints—a review. Fuel 247, 237-249]. On the other hand, shales, which are sedimentary rocks comprised of clay, silt, and fine sand, can cause wellbore instability when they come into contact with water-based drilling muds (WBM) [Nayak, P. S., Singh, B. K., 2007. Instrumental characterization of clay by FTIR, XRF, BET and, TPD-NH3. Bull. Mater. Sci. 235-238]. Shale swelling is a serious concern that, in some cases, could disrupt the whole drilling process. Therefore, it is essential to monitor and control shale swelling during the drilling operation to avoid any operational problems [Rana, A., Khan, I., Ali, S., Saleh, T. A., Khan, S. A., 2020. Controlling shale swelling and fluid loss properties of water-based drilling mud via ultrasonic impregnated SWCNTs/PVP nanocomposites. Energy Fuel. 34, 9515-9523; Zeynali, M. E., 2012. Mechanical and physico-chemical aspects of wellbore stability during drilling operations. J. Petrol. Sci. Eng. 82-83, 120-124].

In the case of oil-based muds (OBMs), shale swelling is not a concern due to the absence of water in the formulation [Yang X, Shang Z, Shi Y, Peng Y, Yue Ye, Chen S, et al. Influence of salt solutions on the permeability, membrane efficiency and wettability of the Lower Silurian Longmaxi shale in Xiushan, Southwest China. Appl Clay Sci 2018; 158:83-93]. However, environmental issues associated with OBMs have restricted their application, and WBMs are preferred to drill the wellbore [Seyedmohammadi, J., 2017. The effects of drilling fluids and environment protection from pollutants using some models. Model. Earth Syst. Environ. 3, 23]. To minimize shale swelling, clay swelling inhibitors, also known as "shale inhibitors," are added to WBMs [Rana, A., Arfaj, M. K., Saleh, T. A., 2020. Graphene grafted with glucopyranose as a shale swelling inhibitor in water-based drilling mud. Appl. Clay Sci. 199]. The presence of shale inhibitors in WBMs is necessary to avoid hydration, swelling, and disintegration during the drilling process. Shale inhibitors are designed to improve the hydrophobic characteristics of clay surfaces that can minimize water interactions with clay surfaces. Other key functions of the shale inhibitors in the WBMs include temperature control, lubrication of drilling bits, carrying shale cuttings to the surface, and filtration loss control [Rana, A., Saleh, T. A., Arfaj, M. K., 2019. Improvement in rheological features, fluid loss and swelling inhibition of water-based drilling mud by using surfactant-modified graphene. In: Abu Dhabi International Petroleum Exhibition & Conference. Society of Petroleum Engineers].

Nanocomposite, polymers, ionic liquids, natural products, inorganic salts, nano silica, polyamines, polyglycerols, silicates and surfactants are also being used as shale inhibitors [Arfaj, M. K., Rana, A., Saleh, T. A., 2020. Highly efficient modified activated carbon as shale inhibitor for water-based drilling mud modification. In: Abu Dhabi International Petroleum Exhibition & Conference. Society of Petroleum Engineers; Aftab, A., Ismail, A. R., Ibupoto, Z. H., 2017. Enhancing the rheological properties and shale inhibition behavior of water-based mud using nanosilica, multi-walled carbon nanotube, and graphene nanoplatelet. Egypt. J. Petrol. 26, 291-299; Baliga, M. S., Baliga, B. R. V., Kandathil, S. M., Bhat, H. P., Vayalil, P. K., 2011. A review of the chemistry and pharmacology of the date fruits (*Phoenix dactylifera* L.). Food Res. Int. 44, 1812-1822; Ismail, A. R., Aftab, A., Ibupoto, Z. H., Zolkifile, N., 2016. The novel approach for the enhancement of rheological properties of water-based drilling fluids by using multiwalled carbon nanotube, nanosilica and glass beads. J. Petrol. Sci. Eng. 139, 264-275; Murtaza, M., Kamal, M. S., Mahmoud, M., 2020. Application of a novel and sustainable silicate solution as an alternative to sodium silicate for clay swelling inhibition. ACS Omega 5, 17405-17415]; however, they are not environmentally friendly. In recent years, efforts have been made to develop shale inhibitors [Rana A, Arfaj M K, Saleh T A. Advanced developments in shale inhibitors for oil production with low environmental footprints—A review. Fuel 2019; Aftab, A., Ali, M., Sahito, M. F., Mohanty, U. S., Jha, N. K., Akhondzadeh, H., Azhar, M. R., Ismail, A. R., Keshavarz, A., Iglauer, S., 2020. Environmental Friendliness and High Performance of Multifunctional Tween 80/ZnO-Nanoparticles-Added Water-Based Drilling Fluid: An Experimental Approach. ACS Sustain. Chem. Eng. 8, 11224-11243; Zhang, F., Sun, J., Chang, X., Xu, Z., Zhang, X., Huang, X., Liu, J., Lv, K., 2019. A novel environment-friendly natural extract for inhibiting shale hydration. Energy Fuel. 33, 7118-7126; Jiang, G., Li, X., Zhu, H., Yang, L., Li, Y., Wang, T., Wu, X., 2019. Improved shale hydration inhibition with combination of gelatin and KCl or EPTAC, an environmentally friendly inhibitor for water-based drilling fluids. J. Appl. Polym. Sci. 136, 47585]. However, none of them are effective shale swelling inhibitors that are concurrently environmentally friendly and non-toxic.

Plant-based materials are the ideal substitute for toxic chemicals. They are a rich source of natural compounds such as amines, alkaloids, polyphenols, and tannins that can be extracted using simple and inexpensive methods. Additionally, they are a renewable resource that is readily available and environmentally friendly. A few studies have been published in the literature in which plant-based chemicals have been added to WBM as a less toxic substitute. Henna leaves proved decreased linear swelling and had a beneficial effect on fluid loss control [Oseh J O, Norrdin M N A M, Farooqi F, Ismail R A, Ismail I, Gbadamosi A O, et al. Experimental investigation of the effect of henna leaf extracts on cuttings transportation in highly deviated and horizontal wells. J Pet Explor Prod Technol 2019; 9:2387-404].

Although a few plant-based shale inhibitors have been developed in the past, there still exists a need in the oil and gas drilling industry to develop shale inhibitors that are both effective and environmentally friendly. Also, due to strict environmental regulations, chemicals used in the oil and gas drilling processes must have a low ecological footprint. Accordingly, an object of the present disclosure is to describe a chemical additive and corresponding WBM that are biodegradable, non-accumulative, non-toxic, and overcomes the performance limitations of the art.

SUMMARY

In an exemplary embodiment, a drilling fluid composition is described. The drilling fluid composition includes an aqueous base fluid. The drilling fluid composition also includes 0.01 to 10 wt. % of a date palm leaves extract (DPLE). The drilling fluid composition further includes 1 to 10 wt. % of clay particles. In addition, the drilling fluid composition contains 0.01 to 1 wt. % of a base, where each wt. % based on a total weight of the drilling fluid composition. In some embodiments, the date palm leaves extract (DPLE) is homogenously disposed on surfaces of the clay particles. In some embodiments, the clay particles disposed with the DPLE are present in the drilling fluid composition in the form of a composite. In some embodiments, a pellet made from the clay particles treated with the DPLE has a swelling value at least 75% less than a swelling value of the pellet in an aqueous composition that does not contain the DLPE.

In some embodiments, the DPLE is prepared from Saudi Arabia date palm tree leaves.

In some embodiments, the DPLE comprises at least one compound selected from the group consisting of a cellulose compound, a hemicellulose compound, a lignin compound, an extractive substance, and an inorganic salt.

In some embodiments, the DPLE enhances the hydrophobicity of the clay particles after contacting.

In some embodiments, the clay is at least one selected from the group consisting of montmorillonite, nontronite, beidellite, bentonite, bolcon score, laponite, hectorite, saponite, soconite, magadite, kenyaite, stevensite, vermiculite, halloysite, and hydrotalcite.

In some embodiments, the clay is sodium bentonite.

In some embodiments, the base comprises one or more of an alkali hydroxide, an alkali carbonate, an alkali bicarbonate, caustic soda, an alkaline earth metal hydroxide, an alkaline earth metal carbonate, and an alkaline earth bicarbonate.

In some embodiments, the base is sodium hydroxide.

In some embodiments, the aqueous base fluid comprises one or more additives selected from the group consisting of an emulsifier, an anti-foaming agent, a fluid-loss additive, a viscosity modifier, a shale stabilizer, an alkali compound, a bridging agent, and a weighting agent.

In some embodiments, the emulsifier is selected from the group consisting of sodium lauryl sulfate (SLS), sodium dodecylbenzene sulfonate (SDBS), polyacrylate, tall oil fatty acid, and fatty amidoamine. In some embodiments, the anti-foaming agent is selected from the group consisting of polydimethylsiloxane, fatty acid ester, silicon dioxide, and vegetable oil. In some embodiments, the viscosity modifier is selected from the group consisting of a clay, a saccharide, a polysaccharide, a cellulose, an acrylate polymer and copolymer, and a polyvinyl polymer and copolymer. In some embodiments, the fluid-loss additive is selected from the group consisting of a starch, a starch derivative, a cellulose, and a cellulose derivative. In some embodiments, the shale stabilizer is selected from the group consisting of a sodium salt, and a sulfonated asphalt. In some embodiments, the alkali compound is selected from the group consisting of caustic soda and soda ash. In some embodiments, the bridging agent is selected from the group consisting of sodium borate, boric oxide, calcium carbonate, and magnesium oxide. In some embodiments, the weighting agent is selected from the group consisting of barite and hematite.

In some embodiments, the drilling fluid composition has a pH in a range of 8 to 10.

In some embodiments, the drilling fluid composition has a capillary suction time in a range of 50 to 500 seconds.

In some embodiments, the drilling fluid composition has having a zeta potential in a range of −50 to −5 millivolts (mV).

In some embodiments, the drilling fluid composition has a fluid loss in a range of 5 to 20 milliliters (mL) according to ASTM D5891.

In an exemplary embodiment, a method of making the drilling fluid composition is described. The method includes preparing a date palm leaves extract (DPLE) composition containing the DPLE. The method of preparing the DPLE composition includes washing date palm leaves and drying to form cleaned date palm leaves. The method of preparing the DPLE composition further includes grinding the cleaned date palm leaves and heating in water at a temperature of at least 50° C. to form a first mixture. In addition, the method of preparing the DPLE composition includes filtering the mixture to form a filtrate containing the DPLE. The method of preparing the DPLE composition also involves adjusting a concentration of the filtrate with water to form the DPLE composition. In some embodiments, the date palm leaves are Saudi Arabia date palm tree leaves. In some embodiments, the DPLE composition comprises 0.5 to 50 wt. % of the DPLE.

In some embodiments, the date palm leaves comprise 5 to 15 wt. % ash, 30 to 50 wt. % cellulose, 5 to 15 wt. % hemicellulose, 20 to 40 wt. % lignin, and 1 to 10 wt. % extractive, each wt. % based on a total weight of the date palm leaves.

In an exemplary embodiment, the method of making the drilling fluid composition further includes dispersing the clay particles in the aqueous base fluid to form a suspension. The method also involves mixing the date palm leaves extract (DPLE) composition containing the DPLE with the dispersion to form a second mixture. Additionally, the method involves adjusting the pH of the mixture by adding the base and mixing to form the drilling fluid composition. In some embodiments, the pH of the mixture is in a range of 8 to 10. In some embodiments, the DPLE is present the drilling fluid composition at a concentration of 0.01 to 5 wt. % based on the total weight of the drilling fluid composition.

In an exemplary embodiment, a method of drilling a subterranean geological formation is described. The method includes drilling the subterranean geological formation to form a wellbore therein. The method further includes injecting the drilling fluid composition into the wellbore during the drilling and circulating the drilling fluid composition in the wellbore. The method further includes recovering a product stream from the subterranean geological formation.

In some embodiments, the wellbore is at least one of a vertical wellbore, a deviated wellbore, a multilateral wellbore, and a horizontal wellbore.

In some embodiments, the subterranean geological formation comprises at least one selected from the group consisting of a shale formation, a tar sands formation, a coal formation, a clay formation, and a conventional hydrocarbon formation.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
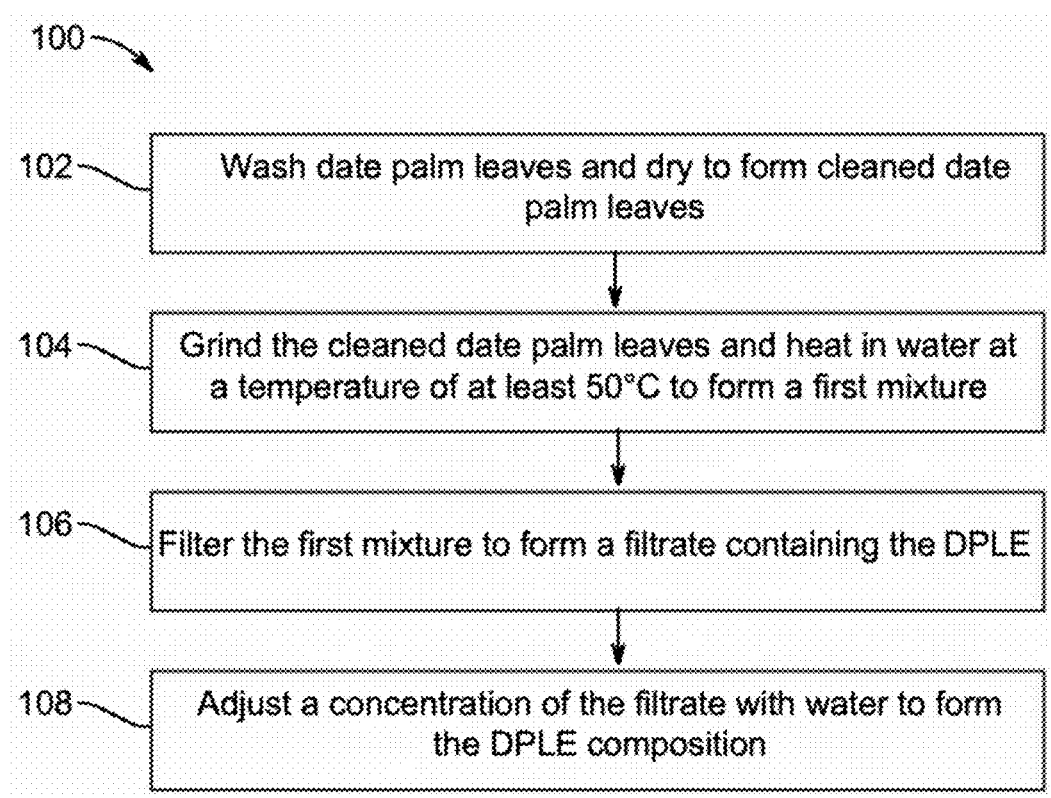
FIG. 1 is a schematic flow chart of a method of preparing a date palm leaves extract (DPLE) composition containing the DPLE, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Conventionally used WBMs cause severe formation damage during the drilling operation when interacting with clay-containing formations. To avoid clay swelling, it is common practice to add swelling inhibitors in WBMs. Aspects of the present disclosure are directed to using a green, environmentally friendly clay swelling inhibitor, e.g., a date palm leaves extract (DPLE)/DPLE composition. The swelling inhibition was evaluated by conducting a linear swelling test, capillary suction timer (CST), zeta potential, rheology, fluid loss, X-ray diffraction (XRD), and scanning electron microscope (SEM). Rheology and filtration experiments were conducted to evaluate the performance of the date palm leaves extract-containing drilling muds. The experimental investigations showed the inhibition potential of the date palm leaves extract. The date palm leaves extract reduced the clay swelling appreciably as compared to distilled water. Moreover, the date palm leaves extract showed comparable performance to a commonly used clay stabilizer (KCl) used in the industry. It was observed that date palm leaves extract reduced the fluid loss and provided a thin filter cake. The rheological properties improved with the addition of the date palm leaves extract. The increase in the size of the clay particles and reduction in zeta potential demonstrated the inhibition properties of the date palm leaves extract. In addition, the date palm leaves extract reduced friction and provided lubricity.

The drilling fluid composition of the present disclosure includes an aqueous base fluid, a date palm leaves extract, clay particles, and a base. Suitable examples of aqueous base fluid include fresh water, seawater, brine, or any other aqueous fluid compatible with the date palm leaves extract and the clay particles of the drilling fluid composition. The aqueous base fluid offers several advantages over the nonaqueous fluids as they are environmentally friendly, safe, and cost-effective. In some embodiments, these fluids may contain various additives to impart desirable chemical and physical properties to the composition.

In an embodiment, the additives include one or more selected from the group consisting of an anti-foaming agent, a gelling agent, a pH control agent, a breaker, an oxidizing breaker, a gel stabilizer, a fluid loss control additive, a clay stabilizer, a corrosion inhibitor, a crosslinking agent, a scale inhibitor, a catalyst, a surfactant, a preservative, a biocide, a thermal stabilizer, a viscosity modifier, a weighting agent, a bridging agent, and a combination thereof.

The surfactant may be nonionic, an anionic surfactant, a cationic surfactant, a viscoelastic surfactant, or a zwitterionic surfactant. Suitable examples of the surfactant include but are not limited to, ammonium lauryl sulfate, sodium lauryl sulfate (SLS), sodium dodecyl sulfate (SDS), alkyl-ether sulfates, such as sodium lauryl ether sulfate (SLES, sodium myreth sulfate, docusate (dioctyl sodium sulfosuccinate), perfluorooctanesulfonate (PFOS), perfluorobutane sulfonate, alkyl-aryl ether phosphates, alkyl ether phosphates, octenidine dihydrochloride; cetrimonium bromide (CTAB), cetylpyridinium chloride (CPC), benzalkonium chloride (BAC), benzethonium chloride (BZT), dimethyl-dioctadecylammonium chloride, dioctadecyldimethylammonium bromide (DODAB), CHAPS (3-[(3-cholamidopropyl)dimethylammonio]-1-propanesulfonate),
cocamidopropyl hydroxysultaine, ocamidopropyl betaine, phospholipids, and sphingomyelins. In some embodiments, the surfactant may include primary and secondary emulsifiers. Hereinafter, the primary and secondary emulsifiers are collectively referred to as the 'emulsifiers' or 'surfactants' and individually referred to as the 'emulsifier' or 'surfactant', unless otherwise specified. In some embodiments, the primary emulsifier is a polyaminated fatty acid. The primary emulsifier includes a lower hydrophilic-lyophilic balance (HLB) to the secondary emulsifier. In some embodiments, the primary emulsifier may include, but is not limited to, span 60, span 85, span 65, span 40, and span 20. In some embodiments, the primary emulsifier is sorbitan oleate, also referred to as the span 80. In some embodiments, the secondary emulsifier may include, but is not limited to, triton X-100, Tween 80, Tween 20, Tween 40, Tween 60, Tween 85, OP4, and OP 7. In some embodiments, the secondary emulsifier includes a biosurfactant such as a rhamnolipid surfactant.

The fluid loss control additive is added to the drilling fluid to control the loss of the drilling fluid when injected into the subterranean geological formation. Suitable examples of the fluid loss control additive may include, but are not limited to, starch, polysaccharides, silica flour, gas bubbles (energized fluid or foam), benzoic acid, soaps, resin particulates, relative permeability modifiers, degradable gel particulates, hydrocarbons dispersed in fluid, and one or more immiscible fluids. In some embodiments, the fluid loss prevention agent may include corn starch and poly(vinyl butyral)-co-vinyl alcohol-co-vinyl acetate (PVBA).

The crosslinking agent is an additive of the drilling fluid composition that can react with multiple-strand polymers to couple molecules together, thereby creating a highly viscous fluid with a controllable viscosity. The crosslinking agent may include but is not limited to, metallic salts, such as salts of Al, Fe, B, Ti, Cr, and Zr, or organic crosslinkers, such as polyethylene amides and formaldehyde. The breaker is an additive in the drilling fluid that provides the desired viscosity reduction in a specified period. Suitable examples of breakers include, but are not limited to, oxidizing agents (oxidizing breakers), such as sodium chlorites, sodium bromate, hypochlorites, perborate, persulfates, peroxides, and enzymes.

Biocide is an additive in the drilling fluid composition that may kill microorganisms present in the drilling fluid. Suitable examples of the biocide include, but are not limited to, phenoxyethanol, ethylhexyl glycerine, benzyl alcohol, methyl chloroisothiazolinone, methyl isothiazolinone, methyl paraben, ethyl paraben, propylene glycol, bronopol, benzoic acid, imidazolinidyl urea, 2,2-dibromo-3-nitrilopropionamide, and 2-bromo-2-nitro-1,3-propanedial. Corrosion inhibitors are chemical compounds that decrease the corrosion rate of a material, more preferably a metal or an alloy, in contact with the drilling fluid. Suitable examples of corrosion inhibitors include, but are not limited to, imidazolines, and amido amines. In some embodiments, the corrosion inhibiting agent may include, but is not limited to, oxides, sulfides, halides, nitrates, preferably halides, of metallic elements of group IIIa to VIa, such as $SbBr_3$.

The clay stabilizer is an additive of the drilling fluid composition that aids in stabilizing shales and controlling swelling clays. Suitable examples of clay stabilizers include alkali metal halide salts. In some embodiments, the alkali metal halide salt is potassium chloride. In some embodiments, the alkali metal halide salt may include, but is not limited to, sodium chloride, lithium chloride, rubidium chloride, and cesium chloride. In some embodiments, the clay stabilizer may consist of an alkaline earth metal halide salt. In some embodiments, the alkaline earth metal halide salt may include, but is not limited to, calcium chloride, and magnesium chloride.

Scale inhibitors are additives added to the drilling fluid composition to inhibit the formation and precipitation of crystallized mineral salts that form scale. Suitable examples of scale inhibitors include, but are not limited to, phosphonates, acrylic co/ter-polymers, polyacrylic acid (PAA), phosphine poly carboxylic acid (PPCA), phosphate esters, hexamethylene diamine tetrakis (methylene phosphonic acid), diethylene triamine tetra (methylene phosphonic acid), diethylene triamine penta (methylene phosphonic acid) (DETA phosphonate), bis-hexamethylene triamine pentakis (methylene phosphonic acid) (BHMT phosphonate), 1-hydroxyethylidene 1,1-diphosphonate (HEDP phosphonate), and polymers of sulfonic acid on a polycarboxylic acid backbone. Certain other examples of scale inhibitors include phosphine, sodium hexametaphosphate, sodium tripolyphosphate, and other inorganic polyphosphates, hydroxy ethylidene diphosphonic acid, butane-tricarboxylic acid, phosphonates, itaconic acid, and 3-allyloxy-2-hydroxy-propionic acid. In some embodiments, the drilling fluid may include metal sulfide scale removal agents such as hydrochloric acid.

The pH-control agent is an additive added to the drilling fluid composition to adjust the pH of the drilling fluid. Suitable examples include sodium hydroxide, potassium hydroxide, lithium hydroxide, rubidium hydroxide, cesium hydroxide, monosodium phosphate, disodium phosphate, and sodium tripolyphosphate.

Optionally, the drilling fluid composition may contain filtration rate agents, such as sodium carbonate, to reduce the loss of fluids from a mud cake through pores while drilling oil and gas wells. In some embodiments, the drilling fluid may also include a deflocculant. Deflocculant is an additive to prevent a colloid from coming out of suspension or slurries. In some embodiments, the deflocculant may include, but is not limited to, an anionic polyelectrolyte, for example, acrylates, polyphosphates, lignosulfonates (LS), or tannic acid derivatives, for example, quebracho. In some embodiments, the anti-foaming may include but is not limited to polydimethylsiloxane, fatty acid ester, silicon dioxide, and vegetable oil. In some further embodiments, the viscosity modifier may include but is not limited to a clay, a saccharide, a polysaccharide, a cellulose, an acrylate polymer and copolymer, and a polyvinyl polymer and copolymer. In some preferred embodiments, the bridging agent may include but is not limited to sodium borate, boric oxide, calcium carbonate, and magnesium oxide. In some further preferred embodiments, the weighting agent may include but is not limited to barite and hematite.

In some embodiments, the drilling fluid may also include a lubricant. Suitable examples of the lubricant may include, but are not limited to, polyalpha-olefin (PAO), synthetic esters, polyalkylene glycols (PAG), phosphate esters, alkylated naphthalenes (AN), silicate esters, ionic fluids, and multiply alkylated cyclopentanes (MAC). Furthermore, the drilling fluid composition may also include a chelating agent. Suitable examples of the chelating agent may include but are not limited to, dimercaprol (2,3-dimercapto-1-propanol), diethylenetriaminepentaacetic acid (DTPA), hydroxyethylenediaminetriacetic acid (HEDTA), and ethylenediaminetetraacetic acid (EDTA).

The drilling fluid composition includes a date palm leaves extract (DPLE), primarily added to minimize clay swelling during the drilling operation. The concentration of the date palm leaves extract may vary depending on the degree of clay swelling inhibition to be imparted to the composition, which may be obvious to a person skilled in the art. In an embodiment, the date palm leaves extract is about 0.001 to 20 wt. % based on a total weight of the drilling mud composition, preferably 0.01 to 15 wt. %, preferably 0.05 to 10 wt. %, preferably 0.1 to 7 wt. %, or even more preferably 0.5 to 5 wt. %, based on the total weight of the drilling fluid composition. Other ranges are also possible.

In an embodiment, the date palm leaves extract is prepared from Saudi Arabia date palm tree leaves. In another embodiment, the date palm leaves extract is at least one selected from the group consisting of a date palm leaves extract, a date palm leaves pressing, a date palm leaves homogenate, and any combination thereof. The date palm leaves extract includes at least one compound selected from the group consisting of a cellulose compound, a hemicellulose compound, a lignin compound, an extractive substance, and an inorganic salt. In some embodiments, the date palm leaves extract further includes a chlorophyll compound, a tannin compound, a tannin compound, a flavonoid compound, a fatty acid compound, a carotenoid compound, an isoflavone compound, a sterol, a vanillyl alcohol, a lutein compound, a sucrose, and a glucoside. In some embodiments, the fatty acid compound may include but is not limited to a linoleic acid, an oleic acid, a palmitic acid, and an oleanolic.

Adding clay or clay minerals/clay particles in drilling fluids modifies the dispersion's viscosity. Generally, the drilling operation is performed at high temperatures and pressure. Therefore, the clay minerals added to the composition should withstand these conditions. Suitable examples of clay that can be added to the drilling fluid composition include, but are not limited to, bentonite, kaolin, palygorskite, sepiolite, montmorillonite, nontronite, beidellite, bolcon score, laponite, hectorite, saponite, soconite, magadite, kenyaite, stevensite, vermiculite, halloysite, hydrotalcite, and mixtures or salts thereof. Bentonites are smectite-rich clays often used in drilling fluids, and their composition varies from deposit to deposit. Such variations significantly affect the behavior of bentonite-based drilling fluids. Examples of clay that can be added to the composition include sodium bentonite, calcium bentonite, potassium bentonite, sodium montmorillonite, calcium montmorillonite, or a combination thereof.

One of the critical factors that affect the rheological properties of the drilling fluid composition is the concentration of the clay in the composition. It is desirable to have a concentration of 0.1 to 20 wt. % of clay particles based on the total weight of the drilling fluid composition, preferably 1 to 10 wt. %, preferably 4 to 8 wt. %, or even more preferably about 4 wt. % based on the total weight of the drilling fluid composition. Other ranges are also possible. The fibrous materials (e.g., cellulose, hemicellulose, and lignin) chains in the date palm leaves extract interact with the clay particles, forming a composite having a compact structure on the filter cake, thereby preventing/reducing fluid loss to the wellbore formations.

The drilling fluid composition further includes 0.005 to 2 wt. % of a base based on the total weight of the drilling fluid composition, preferably 0.01 to 1 wt. %, preferably 0.05 to 0.75 wt. %, preferably 0.1 to 0.5 wt. %, or even more preferably about 0.25 wt. %, based on the total weight of the drilling fluid composition. Other ranges are also possible. In some embodiments, the base comprises an alkali metal hydroxide, an alkaline earth metal hydroxide, an alkali metal oxide, an alkali carbonate, an alkali bicarbonate, caustic soda, an alkaline earth metal oxide, an alkaline earth metal carbonate, an alkaline earth bicarbonate, or a mixture thereof. In some preferred embodiments, the base is sodium hydroxide.

In some embodiments, the date palm leaves extract is homogenously disposed on surfaces of the clay particles. In some embodiments, at least 70% surface area of the clay particles are covered by the date palm leaves extract based on a total surface area of the clay particles, preferably at least 80%, preferably at least 90%, preferably at least 95%, or even more preferably at least 99% based on the total surface area of the clay particles. Other ranges are also possible.

In some embodiments, the drilling fluid has a pH in a range of 7 to 12, preferably 8 to 10, preferably 8.5 to 9.5, or even more preferably about 9. Other ranges are also possible.

As used herein, the term "fluid loss" generally refers to a leakage of the liquid phase of drilling fluid, slurry or treatment fluid containing solid particles into the formation matrix. An API fluid loss test is performed according to ASTM D5891. In some embodiments, the drilling fluid has a fluid loss in a range of 5 to 20 milliliters (mL), preferably 8 to 17 mL, preferably 11 to 14 mL, or even more preferably about 12 mL. Other ranges are also possible.

The swelling inhibition capabilities of the drilling fluid composition were evaluated based on the capillary suction time and zeta potential studies. In some embodiments, the drilling fluid composition has a capillary suction time in a range of 50 to 500 seconds; particularly, in a range of 100-300 seconds; and more particularly about 200 seconds. In some embodiments, the zeta potential ranges between −50 to −5 millivolts (mV); and more particularly, −30 to −15 mV, or even more particularly about −25 mV. In some further preferred embodiments, the drilling fluid composition of the present disclosure shows a pellet made from the clay particles treated with the DPLE has a swelling value at least 75% less than a swelling value of the pellet in an aqueous composition that does not contain the DLPE, preferably at least 60% less, preferably at least 50% less, or even more preferably at least 40% less than the swelling value of the pellet in the aqueous composition that does not contain the DLPE. Other ranges are also possible.

Figure 2:
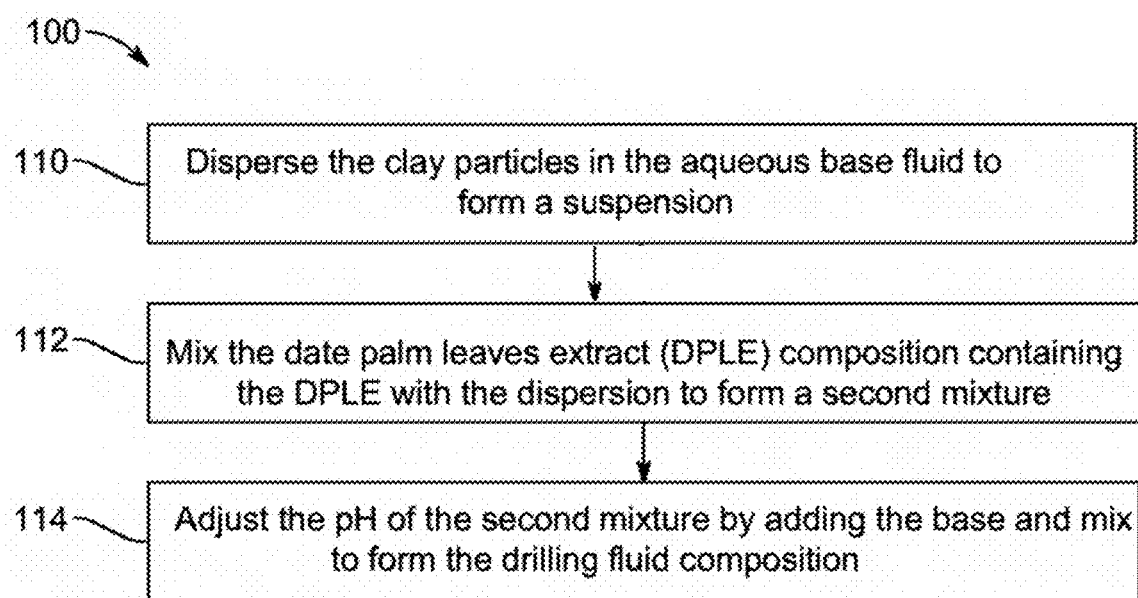
FIG. 2 is a schematic flow chart of a method of making a drilling fluid composition, according to certain embodiments.

FIGS. 1 and 2 illustrate a schematic flow chart of a method 100 of making the drilling fluid composition. The method 100 includes preparing a date palm leaves extract (DPLE) composition containing the DPLE. The order in which the method 100 is described is not intended to be construed as a limitation, and any number of the described method steps can be combined in any order to implement the method 100. Additionally, individual steps may be removed or skipped from the method 100 without departing from the spirit and scope of the present disclosure.

Figure 4:
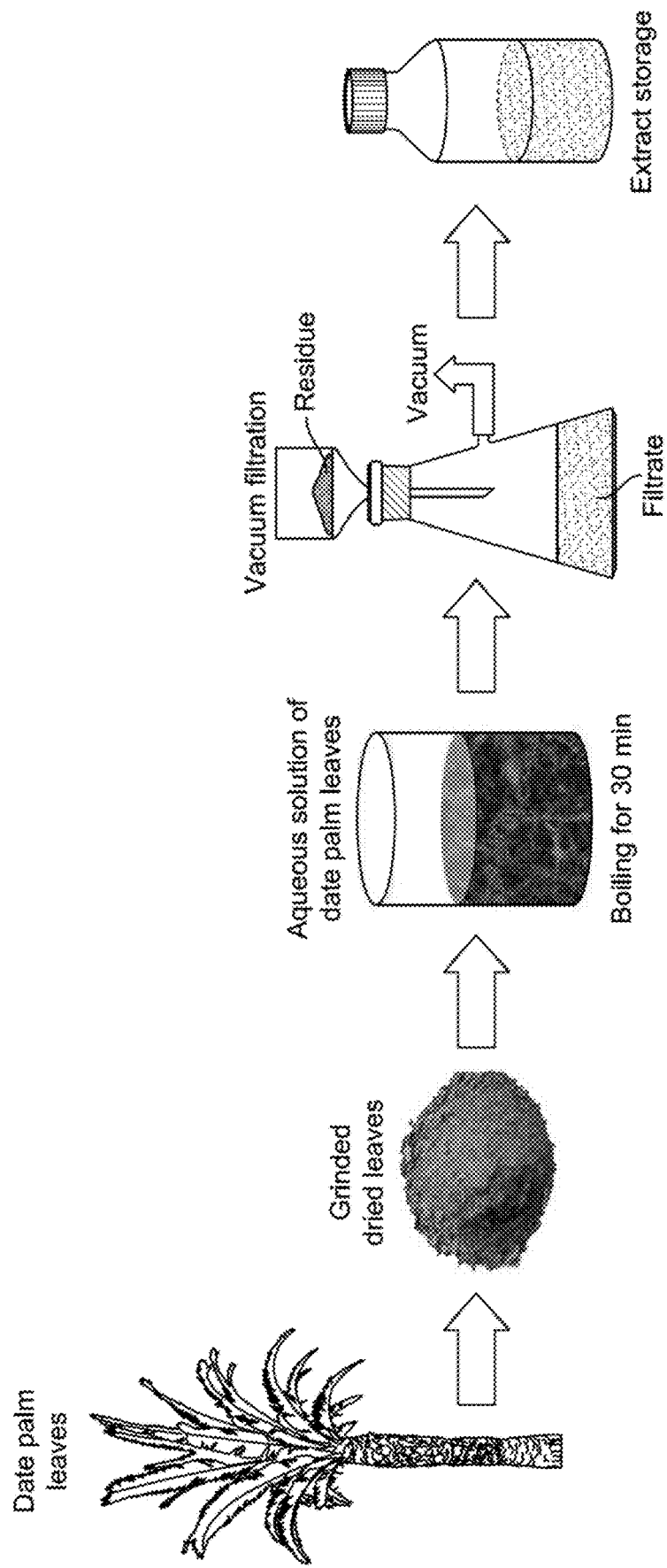
FIG. 4 is a schematic illustration depicting the preparation of the date palm leaves extract (DPLE) composition containing the DPLE, according to certain embodiments.

At step 102, the method 100 includes washing date palm leaves and drying to form cleaned date palm leaves. In some embodiments, the date palm leaves are obtained from Saudi Arabia date palm tree in the area of Al-Khobar. In some embodiments, the date palm leaves are washed with water for at least 3 times, at least 7 times, or at least 15 times until no dust particles are observed on surfaces of the date palm leaves. In some further embodiments, the date palm leaves after the washing are dried at room temperature for at least 1 day, preferably at least 3 days, preferably at least 5 day, or even more preferably at least 7 days, as depicted in FIG. 4. The purpose of the drying is to remove water molecules from the date palm leaves. In some embodiments, the date palm leaves after the drying may contain ash, a cellulose compound, a hemicellulose compound, a lignin compound, an extractive substance, and an inorganic salt. In some embodiments, the date palm leaves after the drying further includes a chlorophyll compound, a tannin compound, a tannin compound, a flavonoid compound, a fatty acid compound, a carotenoid compound, an isoflavone compound, a sterol, a vanillyl alcohol, a lutein compound, a sucrose, and a glucoside. In some embodiments, the fatty acid compound may include but is not limited to a linoleic acid, an oleic acid, a palmitic acid, and an oleanolic. In some more preferred embodiments, the date palm leaves after the drying contain 5 to 15 wt. % ash, 30 to 50 wt. % cellulose, 5 to 15 wt. % hemicellulose, 20 to 40 wt. % lignin, and 1 to 10 wt. % extractive, each wt. % based on a total weight of the date palm leaves. Other ranges are also possible.

At step 104, the method 100 includes grinding the cleaned date palm leaves and heating in water at a temperature of at least 50° C. to form a first mixture. In some embodiments, the cleaned date palm leaves may be grinded in a kitchen grinder, as depicted in FIG. 4. The grinding may be carried out with a mortar and pestle or using any other grinding techniques known in the art. In some further embodiments, the cleaned date palm leaves after the grinding may have an average length of less than 20 centimeters (cm), preferably less than 10 cm, preferably less than 5 cm, or even more preferably less than 2 cm. In some preferred embodiments, the heating is performed in water at a temperature of at least 40° C., preferably at least 50° C., preferably at least 70° C., or even more preferably at least 100° C. to form the mixture, as depicted in FIG. 4. In some further preferred embodiments, the heating is performed for at least 10 minutes, preferably at least 30 minutes, preferably at least 60 minutes, or even more preferably at least 120 minutes. Other ranges are also possible.

At step 106, the method 100 includes filtering the mixture to form a filtrate containing the date palm leaves extract (DPLE). In some embodiments, the mixture is filtered by vacuum filtration via a filter paper, as depicted in FIG. 4. In some embodiments, the filter paper has an average pore size of less than 100 micrometers (μm), preferably less than 50 μm, preferably less than 25 μm, preferably less than 10 μm, or even more preferably less than 5 μm. Other ranges are also possible.

At step 108, the method 100 includes adjusting a concentration of the filtrate with water to form the DPLE composition. In some embodiments, the water is added to the filtrate to obtain the DPLE composition having a required concentration, as depicted in FIG. 4. In some further embodiments, the DPLE composition comprises 0.5 to 50 wt. % of the DPLE based on a total weight of the DPLE composition, preferably 1 to 25 wt. %, preferably 1.5 to 10 wt. % or even more preferably 2 to 5 wt. % based on the total weight of the DPLE composition. Other ranges are also possible.

At step 110, the method 100 includes dispersing the clay particles in the aqueous base fluid to form a suspension. In some embodiments, the suspension has an average particle size ($D_{50}$) in a range of 0.5 to 500 μm, preferably 1 to 100 μm, or even more preferably 2 to 50 μm. Other ranges are also possible. Suitable examples of clay that can be added to the aqueous base fluid include, but are not limited to, bentonite, kaolin, palygorskite, sepiolite, montmorillonite, and mixtures or salts thereof. In some preferred embodiments, the clay may be bentonite. In some more preferred embodiments, the bentonite may include sodium bentonite, calcium bentonite, potassium bentonite, sodium montmorillonite, calcium montmorillonite, or a combination thereof. In some embodiments, the aqueous base fluid includes freshwater, seawater, brine, or any other aqueous fluid compatible with the date palm leaves extract and the clay particles of the drilling fluid composition.

At step 112, the method 100 includes mixing the date palm leaves extract (DPLE) composition containing the DPLE with the dispersion to form a second mixture. The concentration of the date palm leaves extract composition may vary depending on the degree of clay swelling inhibition to be imparted to the composition, which may be obvious to a person skilled in the art. In some embodiments, the DPLE is present the drilling fluid composition at a concentration of 0.01 to 5 wt. % based on the total weight of the drilling fluid composition, preferably 0.04 to 4 wt. %, or even more preferably 0.1 to 2 wt. % based on the total weight of the drilling fluid composition. Other ranges are also possible.

In some embodiments, the date palm leaves extract (DPLE) is homogenously disposed on surfaces of the clay particles in the second mixture. In some embodiments, at least 70% surface area of the clay particles are covered by the date palm leaves extract based on a total surface area of the clay particles, preferably at least 80%, preferably at least 90%, preferably at least 95%, or even more preferably at least 99% based on the total surface area of the clay particles. In some embodiments, DPLE-coated clay particles have an average particle size ($D_{50}$) in a range of 0.5 to 500 μm, preferably 1 to 100 μm, preferably 1.5 to 50 μm, or even more preferably 2 to 10 μm. Other ranges are also possible. In some embodiments, the DPLE-coated clay particles are in the form of a film after drying the drilling fluid composition. In some further embodiments, the film of the DPLE-coated clay particles formed after the drying has a smooth surface and a reduced porosity. As used herein, the term "porosity" generally refers to the fraction of void space within a porous material (e.g., clay particles). In some preferred embodiments, the film of the DPLE-coated clay particles has a porosity of less than 35%, preferably less than 25%, preferably less than 15%, preferably less than 5%, or even more preferably less than 1%. Other ranges are also possible.

At step 114, the method 100 includes adjusting the pH of the second mixture by adding the base and mixing to form the drilling fluid composition. In some embodiments, the base may be one or more of an alkali hydroxide, an alkali carbonate, an alkali bicarbonate, caustic soda, an alkaline earth metal hydroxide, an alkaline earth metal carbonate, and an alkaline earth bicarbonate. Suitable examples include sodium hydroxide, potassium hydroxide, lithium hydroxide, rubidium hydroxide, cesium hydroxide, monosodium phosphate, disodium phosphate, and sodium tripolyphosphate. In some preferred embodiments, the base is sodium hydroxide. In some more preferred embodiments, the base is present in the drilling fluid composition at a concentration of 0.01 to 1 wt. % based on the total weight of the drilling fluid composition, preferably 0.05 to 0.8 wt. %, preferably 0.1 to 0.6 wt. %, or even more preferably 0.2 to 0.4 wt. % based on the total weight of the drilling fluid composition. Other ranges are also possible.

The crystalline structures of sodium bentonite (Na-Ben), a date palm leaves extract (DPLE) composition, a sodium bentonite modified with 2% DPLE composition (Na-Ben+2% DPLE), and a sodium bentonite modified with 5% DPLE composition (Na-Ben+5% DPLE) were characterized by the Fourier transform infrared spectra (FTIR). FTIR spectra were studied by using Fourier transform infrared spectra (Thermo-Scientific). For the Fourier transform infrared spectra characterization, the KBr discs of the samples were prepared by mixing and grounding the samples with KBr powder in mortar with pestle. The mixture was then shaped into discs under mechanical pressure. The samples discs are put into Fourier transform infrared spectra and spectral measurements were recorded in the wavenumber range of 500-4000 $cm^{-1}$. Prior to the above measurement, the samples are vacuum-dried at 60° C. for a duration of 24 h.

Figure 6:
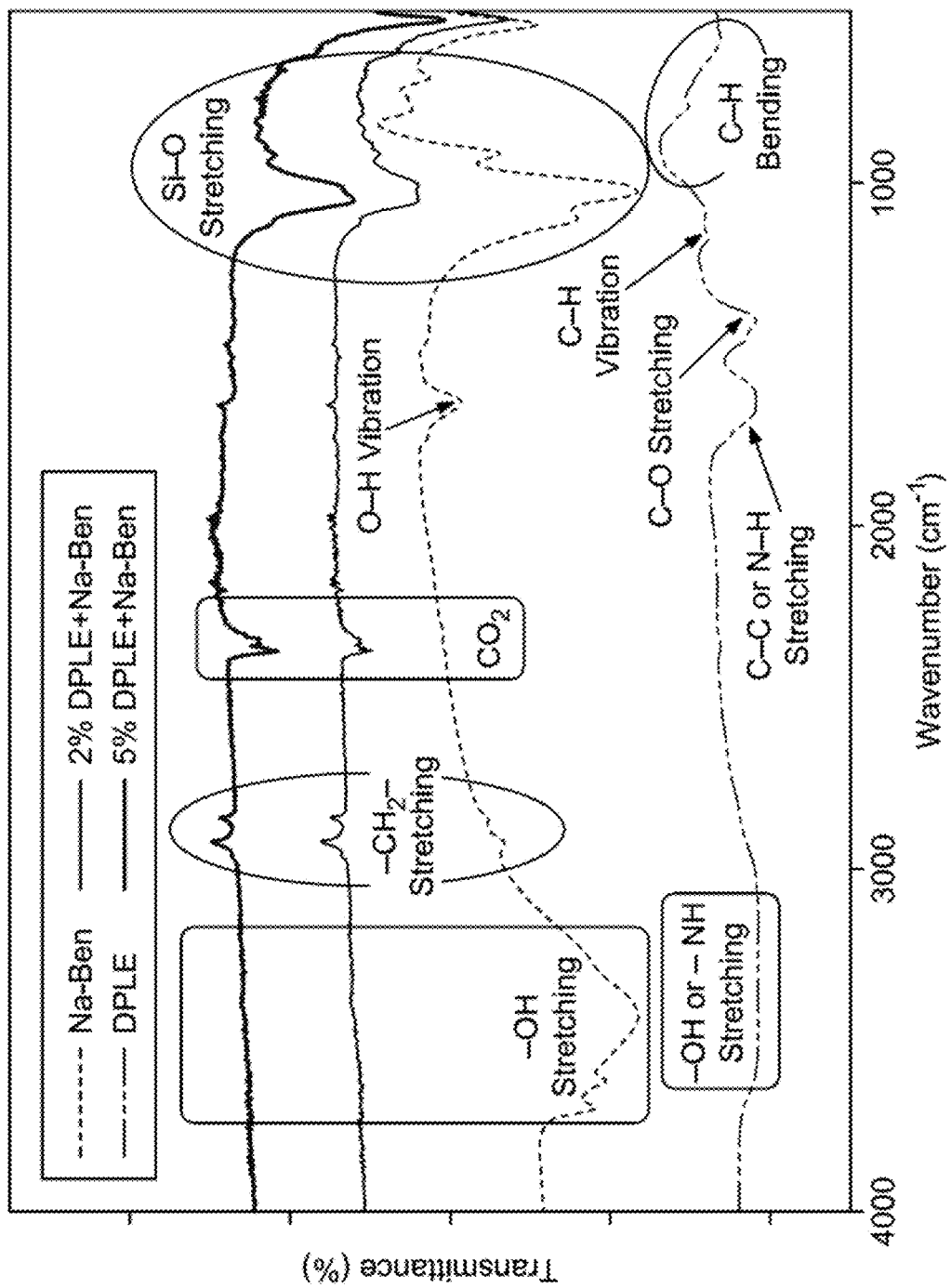
FIG. 6 is a Fourier transform infrared (FTIR) analysis of sodium bentonite, the DPLE composition, the sodium bentonite modified with 2% DPLE composition, and the sodium bentonite modified with 5% DPLE composition, according to certain embodiments.

In some embodiments, the Na-Ben has a first intense peak in a range of 600 to 1200 $cm^{-1}$, a second intense peak in a range of 1250 to 1750 $cm^{-1}$, and a third intense peak in a range of 3000 to 4000 $cm^{-1}$ in an FTIR spectrum, as depicted in FIG. 6. In some further embodiments, the DPLE composition has at least one first intense peak in a range of 1000 to 1800 $cm^{-1}$, and a second intense peak in a range of 3000 to 4000 $cm^{-1}$ in the FTIR spectrum, as depicted in FIG. 6. In some preferred embodiments, the Na-Ben+2% DPLE has a first intense peak in a range of 800 to 1200 $cm^{-1}$, a second intense peak in a range of 2000 to 2800 $cm^{-1}$, and a third intense peak in a range of 2800 to 3000 $cm^{-1}$ in the FTIR spectrum, as depicted in FIG. 6. In some more preferred embodiments, the Na-Ben+2% DPLE has a first intense peak in a range of 800 to 1200 $cm^{-1}$, a second intense peak in a range of 2000 to 2800 $cm^{-1}$, and a third intense peak in a range of 2800 to 3000 $cm^{-1}$ in the FTIR spectrum, as depicted in FIG. 6.

In some embodiments, the Na-Ben may have a Si—O bond, an O—H bond, and a hydroxyl group (—OH), as depicted in FIG. 6. In some embodiments, the DPLE composition may have a C—O bond, a C=C bond, an N—H bond, a hydroxyl group (—OH), and an amine group (—NH), as depicted in FIG. 6. In some further embodiments, the DPLE composition may interact with the Na-Ben particles via at least one bond or at least one functional groups described above to form the DPLE-coated sodium bentonite present in the drilling fluid composition in the form of a composite. In some embodiments, the DPLE-coated sodium bentonite may have a Si—O bond, a $CO_2$ group, and a —$CH_2$— bond.

The thermostability of the sodium bentonite (Na-Ben), the date palm leaves extract (DPLE) composition, the sodium bentonite modified with 2% DPLE composition (Na-Ben+2% DPLE), and the sodium bentonite modified with 5% DPLE composition (Na-Ben+5% DPLE) are characterized by thermal gravimetric analysis (TGA). TGA analysis is performed by using a thermogravimetric analyzer (SDT Q 600, TA Instruments, New Castle, USA). For the TGA analysis, the samples are measured by heating at an increment frequency of 5 to 20° C./min with the flow of nitrogen in a range of 25 to 150 mL/min, and a temperature of up to 1200° C. Other ranges are also possible.

Figure 7:
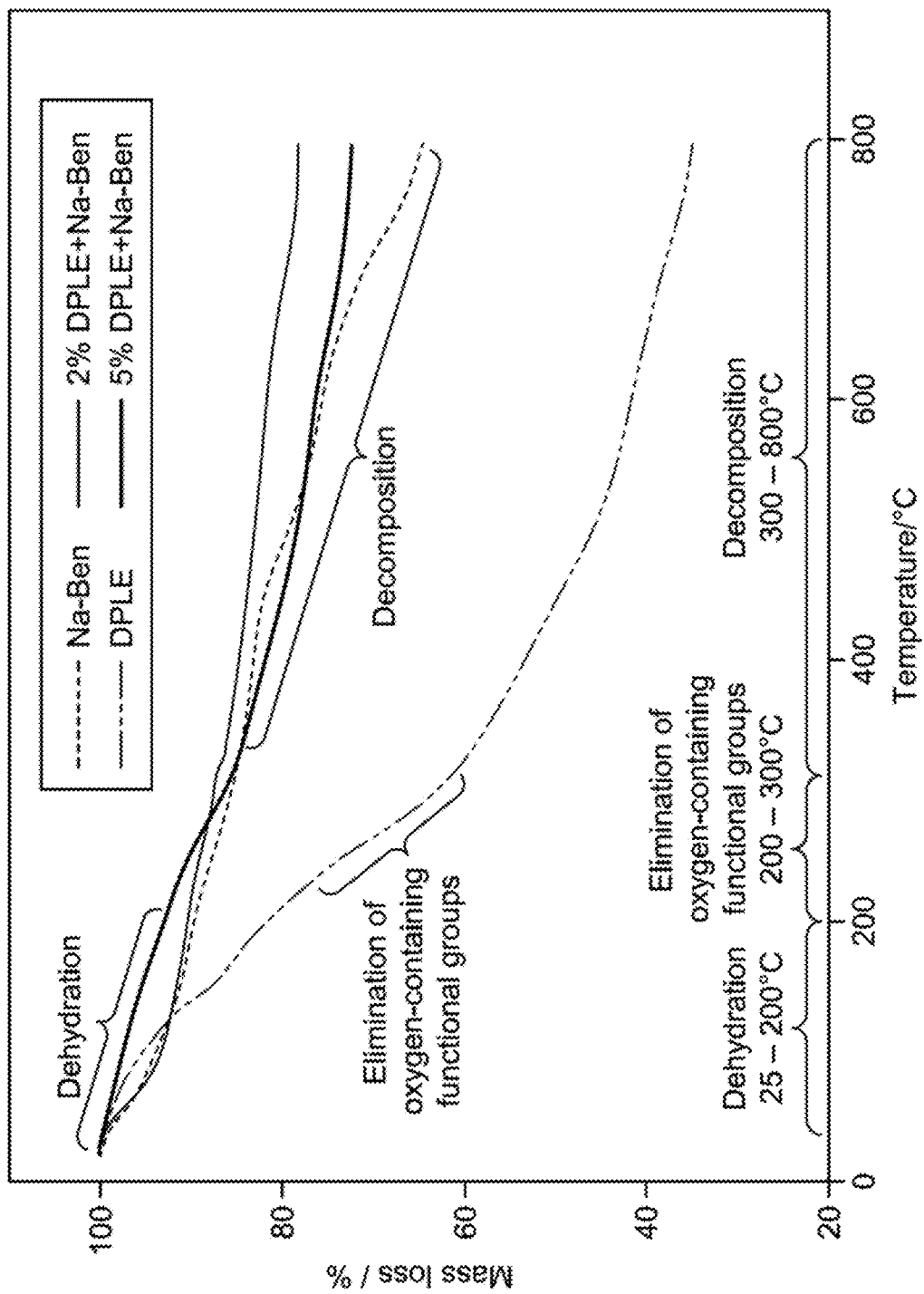
FIG. 7 is a plot depicting the thermogravimetric analysis (TGA) of sodium bentonite, the DPLE composition, the sodium bentonite modified with 2% DPLE composition, and the sodium bentonite modified with 5% DPLE composition, according to certain embodiments.

In some embodiments, the Na-Ben has a mass loss of up to 40 wt. % based on an initial weight of the Na-Ben, as depicted in FIG. 7. In some further embodiments, the DPLE composition has a mass loss of up to 36 wt. % based on an initial weight of the DPLE composition, as depicted in FIG. 7. In some preferred embodiments, the Na-Ben+2% DPLE has a mass loss of up to 30 wt. % based on an initial weight of the Na-Ben+2% DPLE sample, as depicted in FIG. 7. In some more preferred embodiments, the Na-Ben+5% DPLE has a mass loss of up to 30 wt. % based on an initial weight of the Na-Ben+5% DPLE sample, as depicted in FIG. 7. Other ranges are also possible.

Figure 8:
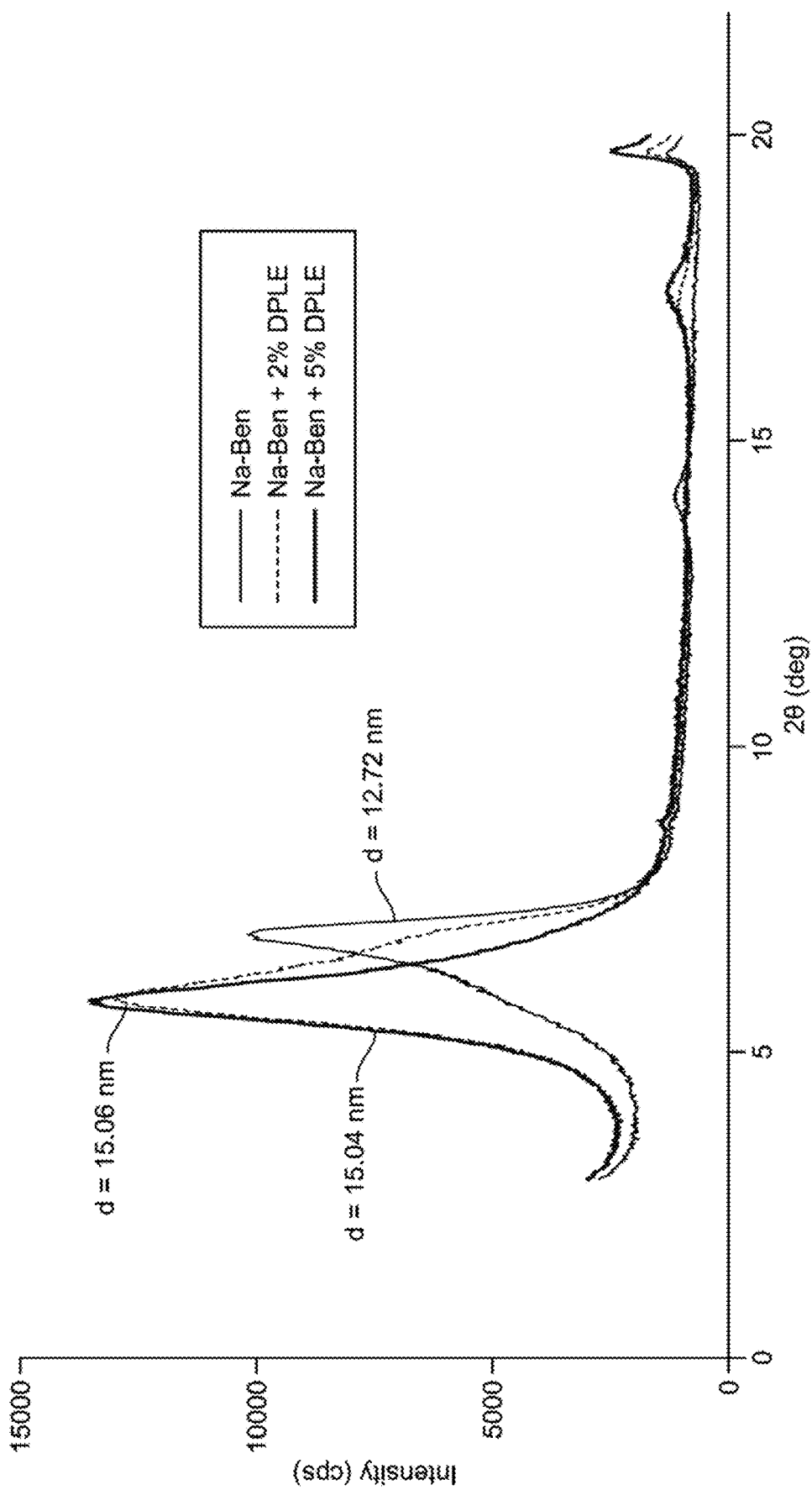
FIG. 8 shows X-ray diffraction (XRD) results of sodium bentonite, the sodium bentonite modified with 2% DPLE composition, and the sodium bentonite modified with 5% DPLE composition, according to certain embodiments.

The crystalline structures of the sodium bentonite (Na-Ben), the sodium bentonite modified with 2% DPLE composition (Na-Ben+2% DPLE), and the sodium bentonite modified with 5% DPLE composition (Na-Ben+5% DPLE) are characterized by a Powder X-ray diffraction (P-XRD), respectively. In some embodiments, the XRD patterns are collected in an Empyrean Powder X-ray diffractometer equipped with a Cu-Kα radiation source (λ=0.15406 nm) for a 2θ range extending between 0 and 40°, preferably 1 and 20°, further preferably 5 and 15° at an angular rate of 0.005 to 5° $s^{-1}$, preferably 0.1 to 3° $s^{-1}$, or even preferably 1° $s^{-1}$. In some embodiments, the Na-Ben has an intense peak with a 2 theta (θ) value in a range of 2 to 8° in an X-ray diffraction (XRD) spectrum, as depicted in FIG. 8. In some embodiments, the Na-Ben+2% DPLE has an intense peak with a 2 theta (θ) value in a range of 2.5 to 8.5° in the X-ray diffraction (XRD) spectrum, as depicted in FIG. 8. In some further embodiments, the Na-Ben+5% DPLE has a intense peak with a 2 theta (θ) value in a range of 5 to 10° in the X-ray diffraction (XRD) spectrum, as depicted in FIG. 8. In some embodiments, the Na-Ben has a d-spacing of 11 to 15 Å, preferably about 13 Å. In some further embodiments, the Na-Ben+2% DPLE has a d-spacing of 13 to 17 Å, preferably about 15 Å. In some preferred embodiments, the Na-Ben+5% DPLE has a d-spacing of 13 to 17 Å, preferably about 15 Å. Other ranges are also possible.

Figure 3:
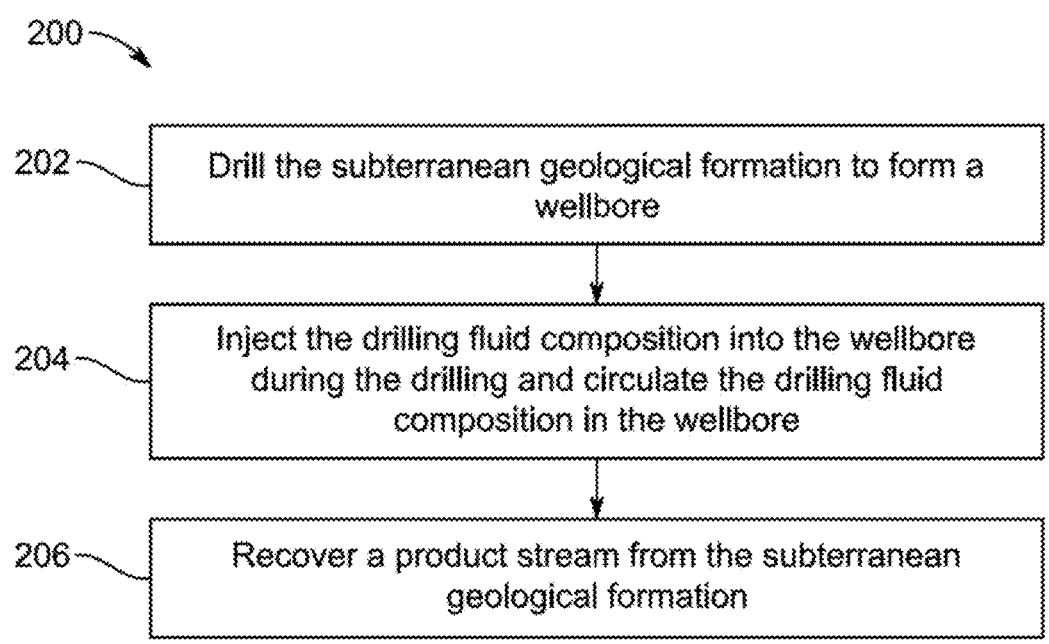
FIG. 3 is a schematic flow chart of a method of drilling a subterranean geological formation, according to certain embodiments.

FIG. 3 illustrate a schematic flow chart of a method 300 of drilling a subterranean geological formation is described. The method 300 includes drilling the subterranean geological formation to form a wellbore therein. In some embodiments, the subterranean geological formation may be a shale formation, a tar sands formation, a coal formation, a clay formation, and a conventional hydrocarbon formation. In some preferred embodiments, the subterranean geological formation is a shale formation. The drilling may be performed with a drill bit. Suitable examples of the drill bit include, but are not limited to, a twist drill, counterbore, countersink, and flat bottom boring. In some embodiments, the subterranean geological formation is drilled with the drill bit coupled to a motor. In the present disclosure, the wellbore is a portion of an oil well or a gas well, i.e., a borehole, that faces a formation matrix of the subterranean geological formation. In some embodiments, the wellbore may be a horizontal wellbore or a multilateral wellbore.

The method 300 further includes injecting the drilling fluid composition containing the DPLE into the wellbore during the drilling and circulating the drilling fluid composition in the wellbore. In some embodiments, the drilling fluid is circulated into the subterranean geological formation through the wellbore to maintain a temperature and pressure in the wellbore that is higher than the static pressure of the subterranean geological formation. In a preferred embodiment, the wellbore has a temperature in a range of 75-400 degrees Fahrenheit (° F.), preferably 100 to 350° F., preferably 150 to 300° F., or even more preferably 200 to 250° F. In a more preferred embodiment, the wellbore has a pressure in a range of 250 to 1,000 psi, preferably 350 to 900 psi, preferably 450 to 800 psi, or even more preferably 550 to 700 psi. Other ranges are also possible.

The method of 300 also includes recovering a product stream from the subterranean geological formation. In some embodiments, the product stream may include but is not limited to crude oil, natural gas, condensate, propane, butane, naphtha, kerosene, diesel, gasoline, liquified petroleum gas, asphalt, and tar.

The DPLE-containing drilling fluids demonstrated reduced fluid loss in different proportions at different concentrations. The cake thickness was reduced upon the addition of the DPLE or DPLE composition. The low fluid loss and thin filter cake make the DPLE a useful solution as a fluid loss controller in water-based drilling fluids (WBDFs). Adding the DPLE or DPLE composition also increased the viscosity and gel strength of the WBDFs. The experimental results show that the DPLE-containing drilling fluids can be used as an alternate solution to conventional drilling fluids.

EXAMPLES

The following examples describe and demonstrate exemplary embodiments of the use of okra mucilage as a shale swelling inhibitor in drilling fluids, as described herein. The examples are provided solely for the purpose of illustration and are not to be construed as limitations of the present disclosure, as many variations thereof are possible without departing from the spirit and scope of the present disclosure.

Example 1: Materials

The date palm is one of the most important fruit crops in the Middle East. The date fruit is the major product of the date palm tree that has numerous health and nutritional for living organisms, which can be consumed in fresh, dried, or processed forms. Additionally, different parts of the date palm tree are also used to treat different health issues such as, fever, paralysis, mental and nervous system issues [Essa, M., Braidy, N., Awlad-Thani, K., Vaishnav, R., Al-Asmi, A., Guillemin, G., Al-Adawi, S., Subash, S., 2015. Diet rich in date palm fruits improves memory, learning and reduces beta amyloid in transgenic mouse model of Alzheimer's disease. J. Ayurveda Integr. Med. 6, 111; Maqsood, S., Adiamo, O., Ahmad, M., Mudgil, P., 2020. Bioactive compounds from date fruit and seed as potential nutraceutical and functional food ingredients. Food Chem. 308, 125522]. The chemical composition of the different parts of the date palm is described in Table 1.

TABLE 1

| Chemical Composition of date palm (%) | | | |
|---|---|---|---|
| Nutrients | Fruits | Seeds | Leaves |
| Ash | 3.43 | 1.18 | 10.54 |
| Lipid | 0.47 | 10.36 | — |
| Protein | 2.91 | 5.67 | — |
| Carbohydrate | 70.39 | 72.59 | — |
| Moisture | 22.8 | 10.20 | — |
| Cellulose | — | — | 40.21 |
| Hemicelluloses | — | — | 12.8 |
| Lignin | — | — | 32.2 |
| Extractive | — | — | 4.25 |

Date palm leaves were obtained from the local farm in Al-Khobar (Saudi Arabia). NaOH was acquired from Sigma Aldrich and may be used to stabilize the pH of drilling muds. Sodium bentonite (Na-Ben) clay was supplied by Halliburton, Saudi Arabia. Na-Ben may be used to study the inhibitive effect in the modified WBM. Distilled water was employed in all examples.

Example 2: Preparation of Aqueous Extract of Date Palm Leaves

For the preparation of aqueous extract, the date palm leaves were obtained from a local farm. Initially, the date palm leaves were collected, washed with water to remove any dust particles, and left for drying at room temperature for about a week. Afterward, the dried palm leaves were crushed into powder by using a kitchen grinder. As depicted in FIG. 4, different concentrations of the aqueous extract were obtained by adding 5 g (5%) and 10 g (10%) of the powdered date palm leaves to 100 ml distilled water, respectively. The mixture was boiled for 30 min and vacuum filtered using a filter paper. The distilled water was added to the filtrate to obtain the required concentration and make the volume correction. Lastly, the solution was preserved in a plastic bottle.

Example 3. Preparation of Drilling Muds

Different sorts of drilling muds were mixed precisely to study the desired features in this work. Firstly, 6 parts (or 6 wt %) of Na-Ben was added to distilled water and mixed thoroughly in a Hamilton Beach mixer at 21000 rpm to afford the base drilling mud (BM). Secondly, 2 parts (2 wt %) DPLE aqueous solution having a DPLE concentration of 2 wt % was introduced to the 6 wt % Na-Ben base mud to afford the 2% DPLE-based drilling mud (DPLEM). After 30 minutes vigorous stirring of the 2% DPLEM, a homogenous drilling mud sample is prepared. NaOH may be used to adjust and maintain the pH of the drilling mud sample around 9.

In another experiment, 6 parts (or 6 wt %) of Na-Ben was added to distilled water and mixed thoroughly in the Hamilton Beach mixer at 21000 rpm to afford the base drilling mud (BM). Secondly, 2 parts (5 wt %) DPLE aqueous solution having a DPLE concentration of 5 wt % was introduced to the 6 wt % Na-Ben base mud to afford the 5% DPLE-based drilling mud (DPLEM). After 30 minutes vigorous stirring of the 5% DPLEM, a homogenous drilling mud sample is prepared. NaOH may be used to adjust and maintain the pH of the drilling mud sample around 9.

Lastly, 0.1 part (0.1 wt %) aqueous solutions of sodium silicate were mixed with 6 wt % of Na-Ben base mud to afford a sodium silicate-based drilling mud (SSM), a reference mud system.

Example 3: Material Characterization

A scanning electron microscope (SEM) was used to evaluate the surface, size, and shape of the above-mentioned samples. Thermo scientific Quattro ESEM, (Czech Republic Vlastimila Pecha) was used in order to get high-resolution SEM images. Thermo-Scientific (Waltham, Massachusetts, USA) Fourier Transform Infrared (FTIR) spectrum was recorded between 500 to 4000 cm$^{-1}$ to assess the vibrational characteristic of the prepared samples. Sample and KBr were mixed at a ratio of 1:100 and transformed to semi-transparent disc where the FTIR spectra were obtained. Thermogravimetric study (SDT Q 600, TA Instruments, New Castle, USA) was carried out by heating the samples at an increment frequency of 10° C./min with the flow of nitrogen (75 mL/min) up to 800° C. The decrease in weight of solid samples was recorded and investigated to measure the stability of the solid samples. The XRD analysis of the Na-Ben and the blend of Na-Ben with extract was studied by Powder XRD, PANanalytical Empyrean. The Cu Kα ($\lambda$=0.154 nm) at an operating current of 35 mA and voltage of 45 kV. The samples were scanned in the °2θ range of 0°-20° at a scan rate of 1°/sec. To get the homogenous mixture, the samples were stirred for 60 min. The samples were dried in an oven overnight and ground to powder form for XRD analysis.

Example 4: Rheological and Swelling Inhibition Study

The rheology properties of the formulated WBM were analyzed by following the American petroleum institute (API) field testing procedures (API-13B) [American Petroleum Institute, 2019. API RP 13B-1 Recommended Practice for Field Testing of Water Based Drilling Fluids, which is incorporated herein by reference in its entirety]. The rheology assessment was performed at 49° C. by using an atmospheric viscometer (OFITE model 900, Houston, USA). The dynamic dial reading at 600 rpm and 300 rpm were noted and used for the calculation of plastic viscosity (PV) and yield point (YP) [Dias, F. T. G., Souza, R. R., Lucas, E. F., 2015. Influence of modified starches composition on their performance as fluid loss additives in invert-emulsion drilling fluids. Fuel 140, 711-716; Rana, A., Arfaj, M. K., Yami, A. S., Saleh, T. A., 2020b. Cetyltrimethylammonium modified graphene as a clean swelling inhibitor in water-based oil-well drilling mud. J. Environ. Chem. Eng. 8, 103802, which are incorporated herein by reference in their entirety]. The apparent viscosity (AV) was measured at 600 rpm. The gel strength of the WBM was measured by operating at 600 rpm for 15 s and turned off for 10 s and 10 min. Later, the viscometer was switched on to 3 rpm speed and the maximum shear stress was noted as gel strength. The fluid loss test is used to assess the amount of filtrate that invaded the formation. The LPLT API filter press (FANN series 300) was used for the fluid loss study. 350 mL drilling mud was introduced to the filter press at room temperature (25° C.) and 100 psi pressure. The filtrate was collected in a cylinder at specific intervals for the period of 30 minutes. The volume of the filtrate obtained during the fluid loss test may be used to assess the features of drilling muds.

The capillary suction timer (CST) is used to indicate the electrolyte concentration in drilling muds and diminish its consequences on bentonite clay [Murtaza, M., Ahmad, H. M., Kamal, M. S., Hussain, S. M. S., Mahmoud, M., Patil, S., 2020. Evaluation of clay hydration and swelling inhibition using quaternary ammonium dicationic surfactant with phenyl linker. Molecules 25, 4333, which is incorporated herein by reference in its entirety]. Herein, an OFITE CST instrument was utilized to demonstrate the inhibition features of the DPLE. The instrument measures the time of filtrate to move between rapidly separated electrodes upon exposure of drilling muds to a fixed area of special filter paper. In order to measure the CST, 5 ml of the drilling muds was placed in the cylinder and the suction pressure of the filter paper under the sample removed the filtrate. The timer was started when the filtrate radially moved in an elliptical pattern and reach the first pair of electrodes. The timer was stopped when the filtrate reached the third electrode with an audible signal. The electrostatic forces of attraction play a vital role in the water and clay interaction. Therefore, inhibitive agents are added to the clay that binds to the clay surface and reduce the surface charge. Due to the decrease of clay water interaction, the clay surface is protected against the reactive action of water. In order to measure the clay surface charge, the zeta potential analyzer was utilized. The higher value of zeta potential demonstrates the large degree of clay hydration and clay swelling. For the zeta potential measurements, two samples were prepared; for the first sample, 2 g of the Na-Ben clay was dissolved in 100 ml of the deionized water, for the second sample 2 g Na-Ben was suspended to 100 ml water followed by the addition of 2 g palm leaves extract. The Na-Ben dispersions were agitated using a magnetic stirrer for 24 h. Finally, the zeta potential of the prepared samples was collected on a Litesizer 500 instrument at 25° C.

The date palm leaves extract was also used in the linear swelling test by using a dynamic liner swell meter (OFITE, Inc, Houston, USA). The Na-Ben pallet was obtained by hydraulic press compression (5000 psi) of 12.0 g Na-Ben for 30 minutes. Subsequently, the Na-Ben pallet was put in the linear swelling cup apparatus, and the prepared solution was also added to the apparatus. The pallet was held for 24 h to assess the % linear swelling.

Example 5: Material Characterization

Figure 5A:
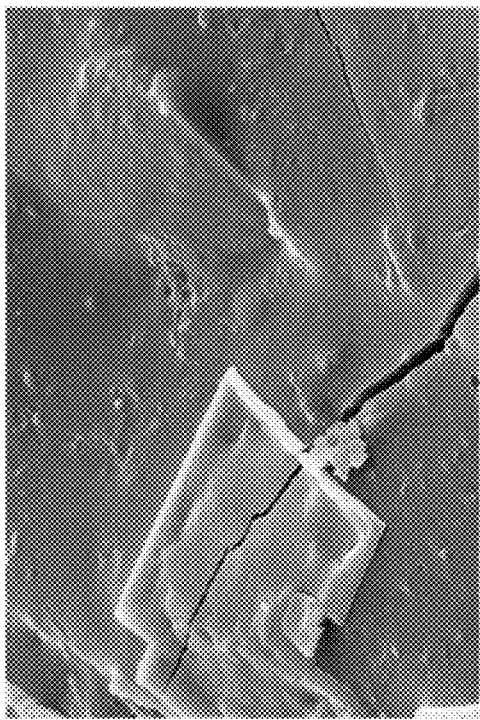
FIG. 5A is a scanning electron micrograph (SEM) image of sodium bentonite exposed to water, according to certain embodiments.
Figure 5B:
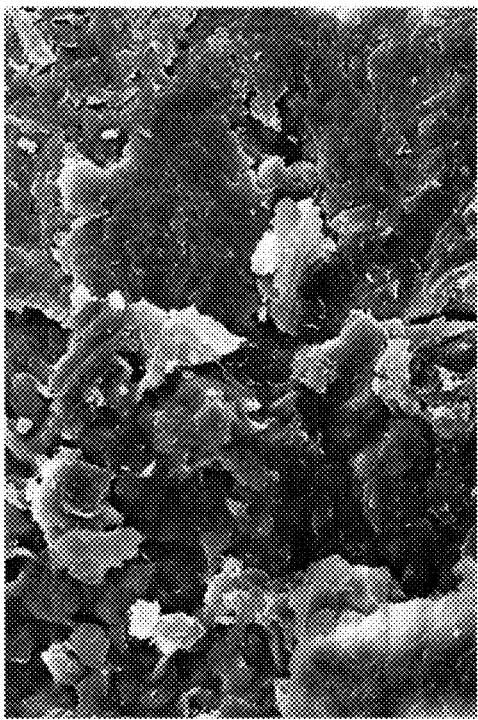
FIG. 5B is an SEM image of the DPLE composition, according to certain embodiments.
Figure 5C:
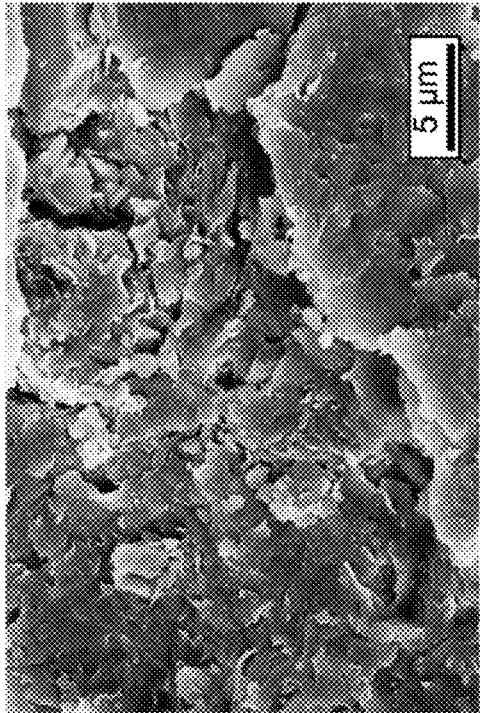
FIGS. 5C and 5D are SEM images of sodium bentonite exposed to the DPLE composition, according to certain embodiments.
Figure 5D:
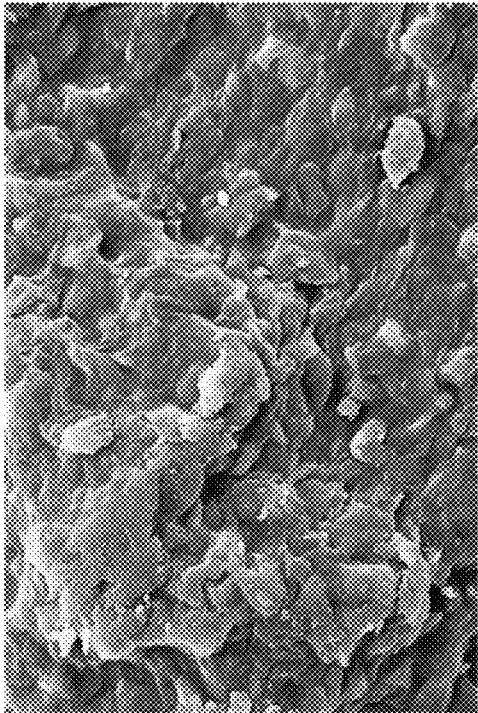

The SEM images of the materials under study are shown in FIGS. 5A to 5D. The Na-Ben naturally has an affinity towards the water and the exposure of Na-Ben to the distilled water leads to a higher rate of hydration and swelling. Therefore, the Na-Ben (FIG. 5A) displayed a rough surface, a large number of particles, and pores. However, the DPLE displayed a tendency to form a smooth layer (FIG. 5B). The Na-Ben exposed to DPLE demonstrated a relatively smooth surface with a fewer number of particles and pores (FIGS. 5C and 5D). The hydration and swelling of Na-Ben decrease after treatment with DPLE. These outcomes helped to conclude that the DPLE forms a hydrophobic protective coating on the surface of Na-Ben therefore protecting it from the reactive action of water.

The FTIR analysis may be used to confirm the structural features of the materials. The FTIR of Bentonite, DPLE and Na-Ben modified with DPLE are shown in FIG. 6. The FTIR spectra of the DPLE showed an absorption band of —OH or —NH stretching at 3323 cm$^{-1}$ [Rana, A., Arfaj, M. K., Saleh, T. A., 2020. Graphene grafted with glucopyranose as a shale swelling inhibitor in water-based drilling mud. Appl. Clay Sci. 199, which is incorporated herein by reference in its entirety]. The stretching vibration band observed at 1640 cm$^{-1}$ could be assigned to C=C or N—H. the absorption band at 1408 cm$^{-1}$ was attributed to C—O stretching. The absorption bands that appeared below 1000 cm$^{-1}$ were attributed to the bending vibration of C—H [Umoren, S. A., Solomon, M. M., Obot, I. B., Suleiman, R. K., 2018. Comparative studies on the corrosion inhibition efficacy of ethanolic extracts of date palm leaves and seeds on carbon steel corrosion in 15% HCl solution. J. Adhes. Sci. Technol. 32, 1934-1951, which is incorporated herein by reference in its entirety]. It is evident from the FTIR spectra that the DPLE consists of heteroatoms like oxygen, nitrogen in the form of functional groups (—OH, N—H, C—O, C—N, etc.) and these functional group might support the adsorption of DPLE onto surfaces of clay particles thereby inhibiting clay swelling. The FTIR spectra of Na-Ben displayed a strong peak of —OH stretching at 3436 cm$^{-1}$. This represents the hydrophilic nature of Na-Ben and its strong affinity towards water. The absorption band at 1659 cm$^{-1}$ was assigned to the angular vibration of O—H of the adsorbed and hydration water. The mixing of DPLE with Na-Ben in different concentrations resulted in the intercalation of DPLE. The characteristic features of Na-Ben remain intact, however, a prominent decrease of the band strength related to —OH was observed at 3436 cm$^{-1}$ and 1659 cm$^{-1}$. The change in Si—O bands is a solid confirmation of strong interaction and bonding between DPLE and Na-Ben [Li, X., Jiang, G., Yang, L., Peng, S., 2018. Study of gelatin as biodegradable shale hydration inhibitor. Colloids Surfaces A Physicochem. Eng. Asp. 539, 192-200, which is incorporated herein by reference in its entirety]. Consequently, it can be inferred that the addition of DPLE to Na-Ben enhances the hydrophobic features of the Na-Ben clay.

The thermogravimetric analysis may be used as an indication of material thermal stability. FIG. 7 demonstrates the behavior of bentonite, DPLE, Na-Ben modified with 2% DPLE and 5% DPLE over a wide range of temperature (25° C.-800° C.). The contents of DPLE were not stable even at low temperature, therefore, the increase in temperature causes prominent mass loss such as an 18.5% decrease in the initial DPLE mass was observed. As the temperature elevated beyond 200° C. cause pyrolysis of functional groups and decomposition of material, consequently, 35.4% of DPLE residue was obtained at the TGA analysis. On the other hand, the Na-Ben is relatively stable, however, it also revealed 11% mass loss due to hydration water. However, the mixing of DPLE with the Na-Ben clay displayed a prominent change in their behavior. Intercalation of the DPLE with Na-Ben improves the hydrophobic features of Na-Ben clay and increases mechanical stability. Finally, 78.7% and 72.4% residue were obtained from 2% DPLE modified Na-Ben and 5% DPLE modified Na-Ben, respectively.

The XRD technique is used to study the changes in the crystalline structure of the mineral samples. The incident X-rays interact with sample material and produce diverse scattering and interferences. The XRD pattern of base mud and the mud modified with DPLE was analyzed by studying the X-ray diffraction pattern as depicted in FIG. 8. It was noticed that the addition of DPLE to the Na-Ben cause an increase in the d-spacing from 12.72 Å to 15.06 Å and 15.04 Å for 2% DPLE and 5% DPLE, respectively. The increase in the d-spacing can be accredited to the intercalation of the DPLE into interlayers of the Na-Ben. The interaction between DPLE and Na-Ben resulted in the removal of interlayer water molecules. Consequently, Na-Ben is being protected against reactive action of water and DPLE demonstrates better inhibition.

Example 6: Rheological Study

The rheological features of the 2% DPLE and 5% DPLE modified WBM were related to the base mud. Various rheological properties of the drilling fluid were studied at 49° C. and 14.7 psi as depicted in Table 2. The assessment of rheological properties can offer critical evidence about the clay swelling inhibitor, load loss by resistance in the laminar regime, affect the pump pressure in the oil well, and the hydraulic cleaning process. The AV is the measure of the interaction of WBM with bentonite clay. The decrease in the AV of base mud in presence of 0.1% Na$_2$SiO$_3$, 2% DPLE, and 5% DPLE is due to less swelling of clay in the presence of modified WBM. The PV indicates the resistance to flow and the nature of solid content in WBM has a major effect on it. A decrease in PV after the addition of 0.1% Na$_2$SiO$_3$, 2% DPLE, and 5% DPLE can be attributed to the flocculating effect of Na-Ben or because of the thinning effect of surfactants. The fluid friction to start motion and measure of forces of attraction between the colloidal particles of WBM is called YP. The YP represents the minimum shear stress required for fluid to begin flowing. This parameter provides an indication of the pseudoplastic index of fluid and solid suspension capacity [Dias, F. T. G., Souza, R. R., Lucas, E. F., 2015. Influence of modified starches composition on their performance as fluid loss additives in invert-emulsion drilling fluids. Fuel 140, 711-716, which is incorporated herein by reference in its entirety]. The fluids with higher YP can cause partial flocculation, clogging of the drilling system, and fluid loss. Therefore, a decrease in YP indicates less flocculation of drilling mud as shown in Table 3.

TABLE 2

Rheology parameters for different drilling fluids

| Parameters | Base Mud | 0.1% Na$_2$SiO$_3$ | 2% DPLE | 5% DPLE |
|---|---|---|---|---|
| AV (mPa · s) | 21.9 | 6.9 | 7.8 | 6.0 |
| PV (mPa · s) | 15.2 | 6.2 | 6.6 | 4.6 |
| YP (Pa) | 13.5 | 1.6 | 2.5 | 2.2 |
| 10 Sec Gel (Pa) | 2.3 | 0.8 | 1.2 | 1.0 |
| 10 Min Gel (Pa) | 8.2 | 1.8 | 10.4 | 5.0 |
| YP/PV | 0.9 | 0.3 | 0.4 | 0.4 |

The gel strength is used as an indication of attractive forces within WBM under no-flow conditions. It is a feature of the drilling fluid that indicates the ability to carry cuttings in static conditions or when circulation is stopped. The addition of 0.1% Na$_2$SiO$_3$, 2% DPLE, and 5% DPLE demonstrate the decrease in gel strength after 10 sec, however, a prominent increase in gel strength was observed after 10 min. It is also noticed that 0.1% Na$_2$SiO$_3$ causes a huge decrease in the rheological features. Although lower rheological properties are required for drilling mud, a large drop of rheological characteristics can make the drilling mud unfit for the drilling operation. Therefore, the drilling mud after the addition of 0.1% Na$_2$SiO$_3$ became unsuitable due to tremendous changes in rheological properties. The outcomes indicate that the introduction of DPLE to the based mud improved its cuttings carrying capacity and make it more suitable for the drilling process.

The YP/PV ratio is the measurement of shear-thinning that can be used to assess the pumping pressure and well cleaning capacity of drilling muds [Avci, E., Mert, B. A., 2019. The rheology and performance of geothermal spring water-based drilling fluids. Geofluids 1-8, which is incorporated herein by reference in its entirety]. There is a direct relation between the shear thinning and the YP/PV ratio. The calculation of YP/PV in Table 2 demonstrated that the base mud sample has the highest value, therefore, high pumping pressure will be required to move mud through pipes, and it will make the pipe cleaning process very difficult. The literature demonstrated that the YP/PV ratio should be 0.375 (Pa/mPA·s) to attain adequate cleaning [Luo, Z., Pei, J., Wang, L., Yu, P., Chen, Z., 2017. Influence of an ionic liquid on rheological and filtration properties of water-based drilling fluids at high temperatures. Appl. Clay Sci. 136, 96-102; Ofei, T. N., Bavoh, C. B., Rashidi, A. B., 2017. Insight into ionic liquid as potential drilling mud additive for high temperature wells. J. Mol. Liq. 242, 931-939, which are incorporated herein by reference in their entirety]. The $Na_2SiO_3$ based mud has a very low YP/PV ratio that will adversely affect the penetration rate and could not clean the drill hole properly. The addition of 2% DPLE and 5% DPLE decrease the YP/PV ratio to 0.4 which is close to 0.375. Therefore, it can be seen from the results that the addition of DPLE improves the rheological features of the drilling muds.

Figure 9:
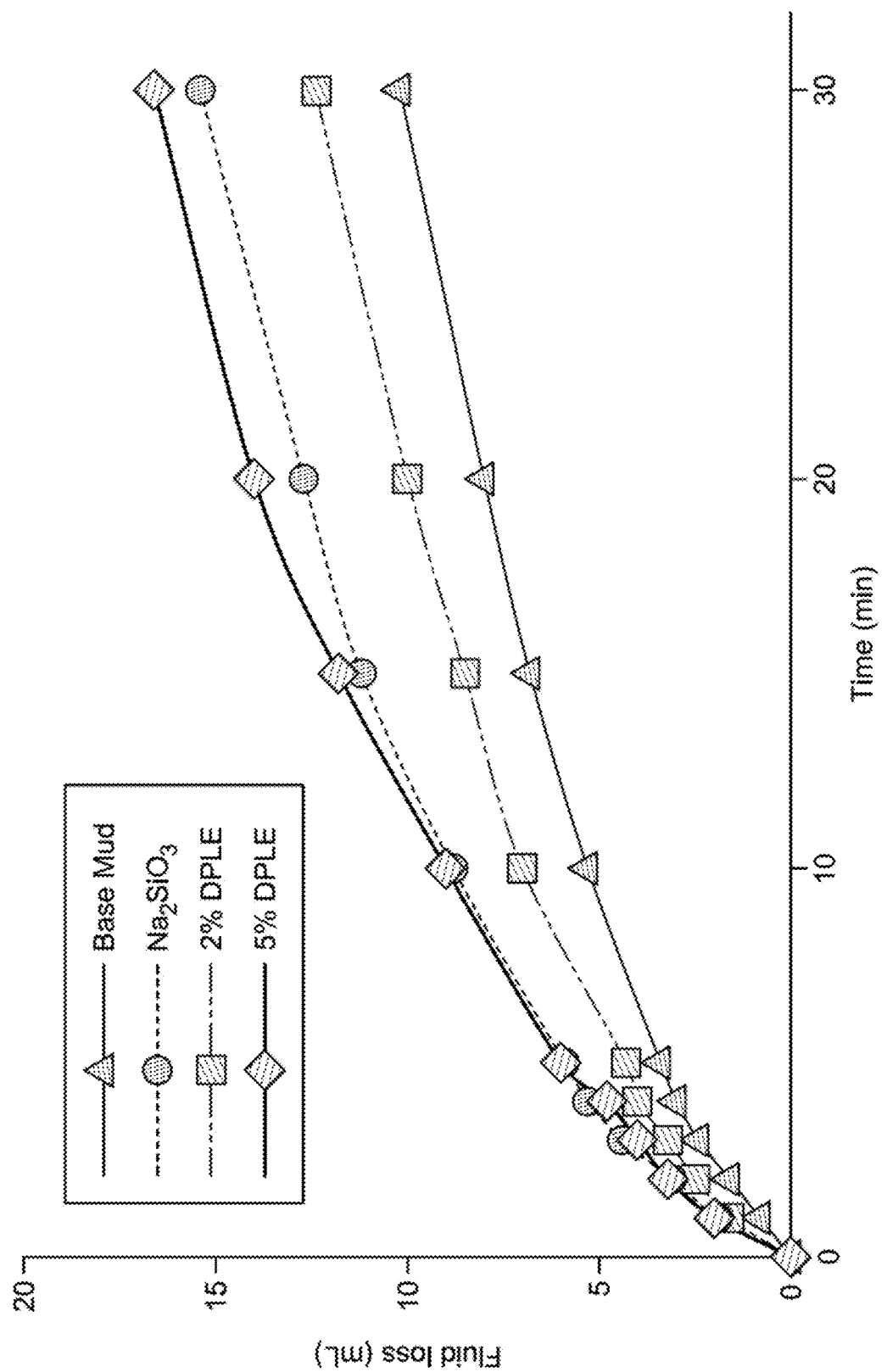
FIG. 9 is a plot depicting the American Petroleum Institute (API) fluid loss volumes of sodium bentonite, the sodium bentonite modified with 2% DPLE composition, and the sodium bentonite modified with 5% DPLE composition, according to certain embodiments.

The fluid loss features of the DPLE based drilling muds were analyzed by utilizing API filter press. The filtration behavior of the drilling muds can be used in determining the rheological features of the WBM. The higher fluid loss can cause borehole damage [Ahmed Khan, R., Murtaza, M., Abdulraheem, A., Kamal, M. S., Mahmoud, M., 2020. Imidazolium-based ionic liquids as clay swelling inhibitors: mechanism, performance evaluation, and effect of different anions. ACS Omega 5, 26682-26696, which is incorporated herein by reference in its entirety]. FIG. 9 demonstrated the fluid loss volume (mL) of drilling muds as a function of time (min) for 30 minutes. The outcomes revealed that the $Na_2SiO_3$ based drilling mud demonstrated higher fluid loss as compared to the base drilling mud. The 2% DPLE based drilling mud displayed much lower fluid loss as compared to $Na_2SiO_3$ based drilling mud, however, a little increase in fluid loss was observed as compared to base mud. However, an increase in the DPLE concentration in the solution of up to 5% demonstrated a further increase in fluid loss. The increase in fluid loss of DPLE based drilling mud as compared to the base mud can be accredited to less flocculation and less pore blockage [Abdul Razak Ismail, T. C. S., Buang, N. A., Sulaiman, W. R. W., 2014. Improve Performance of Water-Based Drilling Fluids Using Nanoparticles, pp. 43-47; Hamad, B. A., He, M., Xu, M., Liu, W., Mpelwa, M., Tang, S., Jin, L., Song, J., 2020. A novel amphoteric polymer as a rheology enhancer and fluid-loss control agent for water-based drilling muds at elevated temperatures. ACS Omega 5, 8483-8495, which are incorporated herein by reference in their entirety]. The outcomes of the fluid loss test are in agreement with the results obtained in the rheological study.

Example 7: Swelling Inhibition Assessment

The CST test is utilized to demonstrate the clay swelling inhibition and characterize the hydration inhibitor [Murtaza, M., Kamal, M. S., Hussain, S. M. S., Mahmoud, M., Syed, N. A., 2020b. Quaternary ammonium gemini surfactants having different spacer length as clay swelling inhibitors: mechanism and performance evaluation. J. Mol. Liq. 308, 113054, which is incorporated herein by reference in its entirety]. The outcomes revealed that the base fluid displayed high capillary suction time i.e., 452 sec. However, for the addition of 2% DPLE, a prominent decrease in the CST time was observed i.e., 171 sec. These results confirmed the better inhibition performance of 2% DPLE. The measurement of Zeta potential shows the charges and stability of the clay particles in the aqueous solution of DPLE. The aqueous suspension of the Na-Ben clay in deionized water displayed a highly negative zeta potential of −37 mV. The highly negative value indicates the higher double layer thickness, swelling, and dispersion of clay particles [Zhong, H., Qiu, Z., Huang, W., Cao, J., 2011. Shale inhibitive properties of polyether diamine in water-based drilling fluid. J. Petrol. Sci. Eng. 78, 510-515, which is incorporated herein by reference in its entirety]. However, the addition of 2% DPLE aqueous solution causes the change in zeta potential towards the less negative value i.e., −20 mV. The increase of the zeta potential after the addition of DPLE may be ascribed by a decrease of repulsive forces between the clay particles and a decrease in clay swelling.

TABLE 3

CST time and Zeta potential of different drilling fluids

| Formulations | CST time (sec) | Zeta potential (mV) |
|---|---|---|
| Base mud (2% wt.) | 452 | −37 |
| DPLE (2%) | 171 | −20 |

Figure 10:
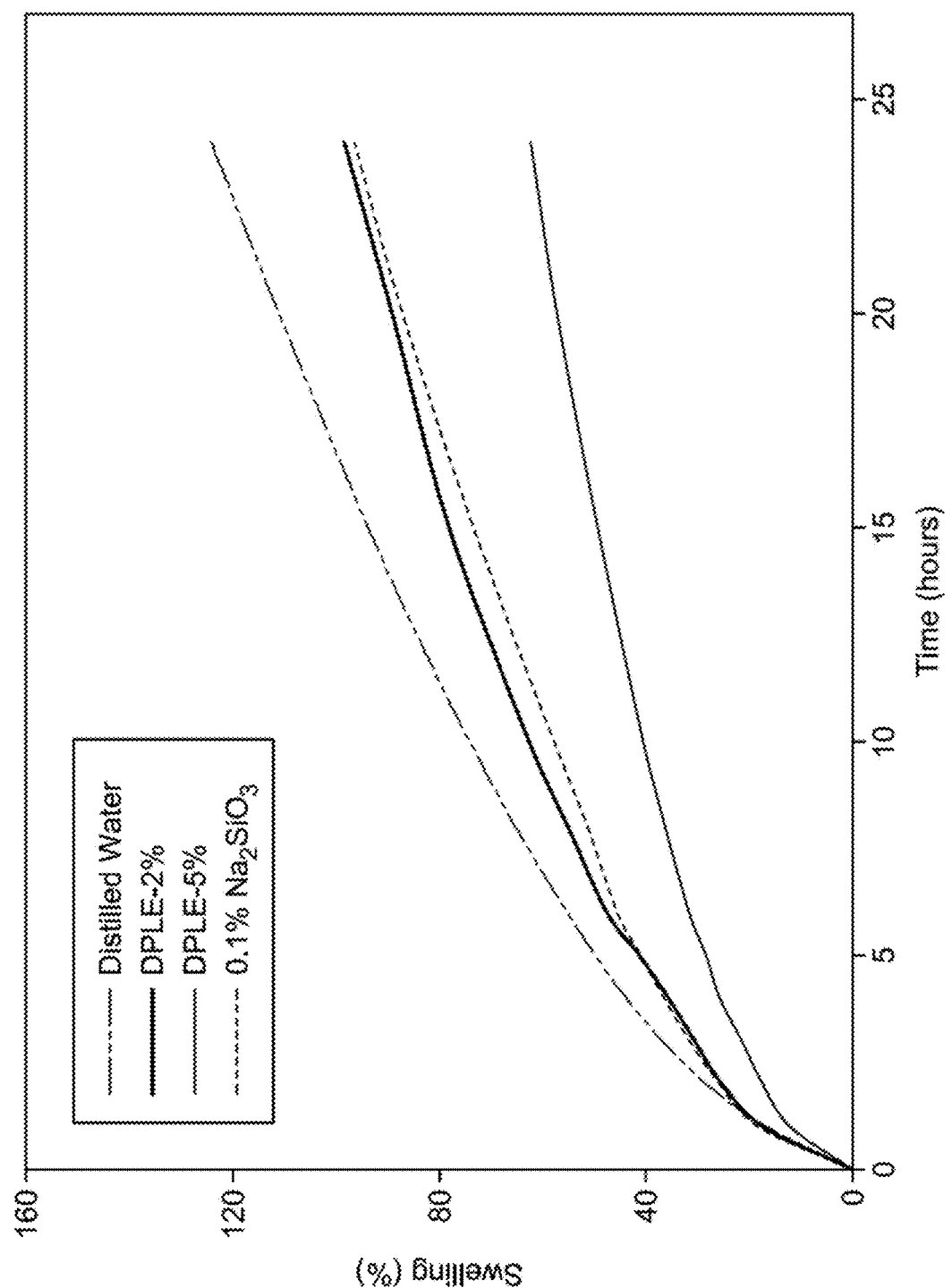
FIG. 10 is a plot depicting a linear swelling trend of sodium bentonite in the presence of various aqueous solutions, according to certain embodiments.

The swelling inhibition capability of the DPLE was measured by employing a linear swelling test. 12 g of the Na-Ben pallet was exposed to water and different concentrations of the DPLE were used to compare their swelling control properties, as depicted in FIG. 10. The testing solutions were poured into the cup of the linear swell tester and linear swelling was measured for 24 h. The Na-Ben pallet demonstrated the highest swelling in the water i.e., 124.2%. However, treatment of Na-Ben pallet with 2% DPLE prominently reduced the swelling to 98.5%. The Na-Ben pallet in 0.1% $Na_2SiO_3$ displayed almost similar % swelling as compared to 2% DPLE. It was noticed that the decrease in the rate of linear swelling was directly proportional to the concentration of the DPLE. Therefore, 5% DPLE further reduced the linear swelling by 36.3%, 34.2%, and 62% as compared to 2% DPLE, 0.1% $Na_2SiO_3$, and water, respectively. The reduction in Na-Ben swelling indicates the strong interaction of Date Palm leaves extract with the clay, which made the clay surface more hydrophobic. These outcomes confirmed the better performance of the DPLE against swelling inhibition of the Na-Ben.

Example 8: Advantages of DPLE as Clay Swelling Inhibitor

The drilling operation is a part of the upstream petroleum industry that can affect the surrounding environment. The drilling cuttings and used fluid are the main waste product during the drilling operation and their disposal is a major issue. The drilling fluid is composed of various kinds of additives that are added for a variety of purposes, they can badly affect the surrounding environment. Swelling inhibitors can be used to control clay swelling and have the ability to affect the clay-water interaction negatively. Therefore, it is important to choose such a chemical as a swelling inhibitor that has a low environmental footprint. Leaf extracts have been studied as corrosion inhibitors, however, none of the studies has been done to explore the swelling inhibition features [Umoren, S. A., Gasem, Z. M., Obot, I. B., 2015. Date palm (*Phoenix dactylifera*) leaf extract as an eco-friendly corrosion inhibitor for carbon steel in 1M hydrochloric acid solution. Anti-corrosion Methods & Mater. 62, 19-28, which is incorporated herein by reference in its entirety]. The date palm can be found in abundance and is one of the important fruit crops of the Gulf region. The date palm produces various beneficial products such as date fruit eaten in fresh or dried forms. Various parts of the date palm are widely used in traditional medicines. Therefore, they have no adverse effect on the surrounding environment and can be used as drilling mud additives for controlling clay swelling. The large area of land is already dedicated to the cultivation of date palm and there is no availability issue as the drilling additive. The date palm leaves are inexpensive and easily available. The date palm leaf extract production is environmentally friendly and very low cost as compared to other swelling inhibitors. Additionally, compatibility with WBM, improvement in drilling fluid rheology, increase in clay hydrophobicity, and clay swelling control are the features that made the date palm leaves extract highly suitable for the WBM as a clay swelling inhibitor.

Example 9: Clay Stability and Inhibition Mechanism

Figure 11:
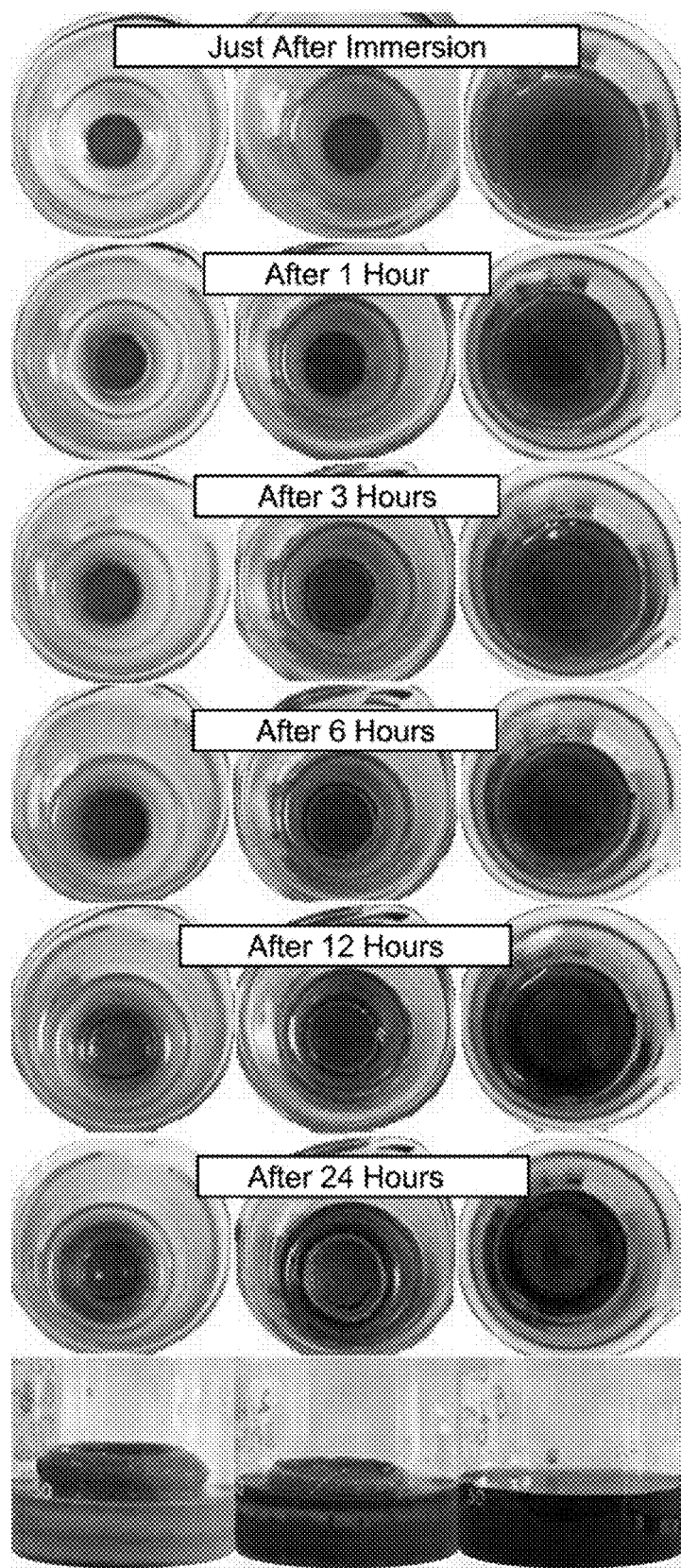
FIG. 11 is a pictorial image showing time-based wetting testing results of sodium bentonite pellet in the presence of water, 2% DPLE composition, and 5% DPLE composition, according to certain embodiments.

The clay characterization, study of the rheological features, and linear swelling analysis confirm the increase in hydrophobic behavior of the bentonite clay after the addition of DPLE. More evidence was collected by performing a time-based wetting test for Na-Ben, as depicted in FIG. 11. The Na-Ben was transformed into pellets by pressurizing in a hydraulic press. The Na-Ben pellets were added to the water, 2% DPLE solution, and 5% DPLE solution, respectively. The pellets were kept under continuous observation and images were captured under specified time intervals. the top pictures were captured right after immersion of pellets in respective solutions. Where the pellets maintain their original shapes and sizes. After 60 mins, the Na-Ben pellet in the water started to swell from the edges. The pellets in 2% DPLE and 5% DPLE solutions also show some swelling, however, it was less prominent as compared to pellets in water. As time passed, the invaded water molecules start to distort the structure of the Na-Ben pellets and these effects can be observed in images captured after 3 hours. The pellet in water not only swelled laterally, but the swelling was increasing prominently in height also. On the other hand, the pellets dipped in DPLE solutions displayed less swelling in height. Among the pellets immersed in DPLE solutions, the higher swelling and degradation was observed in 2% DPLE solution as compared to the pellet in 5% DPLE solution. Therefore, it can be inferred that the increase in the concentration of DPLE helps in controlling the clay swelling. After 24 hours the Na-Ben pellet in water demonstrated a huge increase in size. However, the pellet in 5% DPLE showed the least swelling. The sideway images confirmed that the height of the Na-Ben pellet increases enormously. The pellet dipped in 2% DPLE showed a lower increase in height as compared to water and the 5% DPLE solution showed the best swelling control. The results of the wetting test are in agreement with the linear swelling test, as depicted in FIG. 10. These outcomes confirmed that the DPLE solution improved the mechanical and swelling inhibition features of the Na-Ben clay. Consequently, the DPLE solution might be utilized as WBM additives for bentonite clay swelling control during the drilling process.

Figure 12:
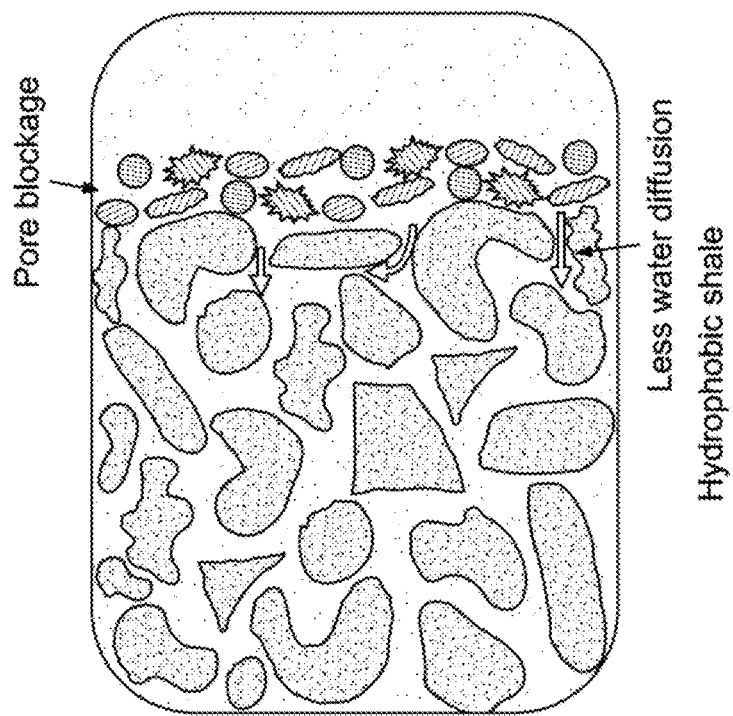
FIG. 12 is a pictorial image showing the DPLE inhibition mechanism on bentonite swelling, according to certain embodiments.
Figure 12:
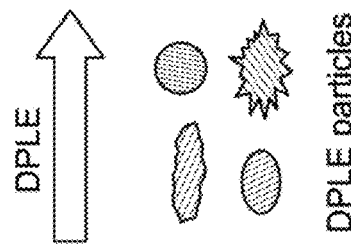
Figure 12:
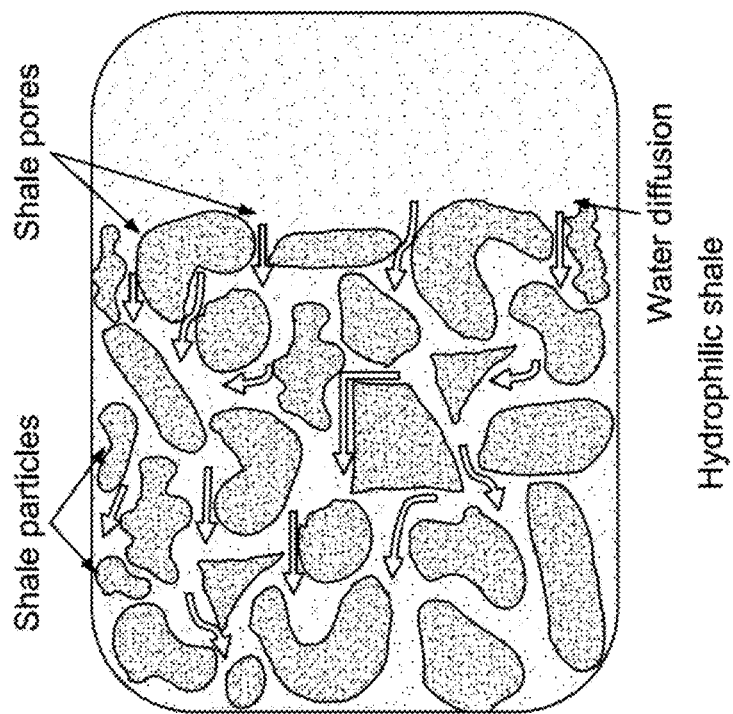

The outcomes of the current study revealed that the DPLE extract has the ability to protect the bentonite clay against the reactive action of water. As mentioned earlier in Table 1, the DPLE extract majorly contains of cellulose, hemicellulose, lignin, and extractive. There are several possible inhibition mechanisms with regards to the DPLE extract due to the higher numbers and complex nature of its constituents. One of the inhibition mechanism of the DPLE extract according to the outcomes obtained in this disclosure is presented. The swelling inhibition capability of the DPLE could be accredited to the diverse inhibition mechanisms such as surface coating, pore, and microcracks plugging cation exchange, and change in the filtrate viscosity. The outcomes of the DPLE analysis demonstrated that the surface coating is playing a role in the clay stability by DPLE extract. The active ingredients on the DPLE are adsorbed on the surface of clay by physical or chemical interaction. The DPLE contains diverse compounds such as flavonoids, carotenoids, and phenols [Baliga, M. S., Baliga, B. R. V., Kandathil, S. M., Bhat, H. P., Vayalil, P. K., 2011. A review of the chemistry and pharmacology of the date fruits (*Phoenix dactylifera* L.). Food Res. Int. 44, 1812-1822; Suleiman, R. K., Iali, W., El Ali, B., Umoren, S. A., 2021. New constituents from the leaves of date palm (*Phoenix dactylifera* L.) of Saudi origin. Molecules 26, 4192, which are incorporated herein by reference in their entirety]. The conjugated aromatic structures, heteroatoms, and free-electron pairs play a role in the formation of their chemical bond with the clay surface. Consequently, the water-sensitive clay surface becomes more hydrophobic and is being protected against the reactive action of water, as depicted in FIG. 12.

To summarize, this study was carried out to demonstrate the clay swelling inhibition features of a new plant-based low-cost and environment-friendly green additive in WBM. DPLE is adsorbed to the surface of bentonite clay and may induce hydrophobicity to the bentonite clay, which prominently changed the wettability of shale. The assessment of rheological properties revealed that the addition of DPLE improved the fluid features and make WBM more suitable for the drilling operation. The linear swelling test confirmed the better swelling control of DPLE as compared to commercially available swelling inhibitors. The 2% DPLE reduced the Na-Ben swelling by 25% as compared to water. However, 5% DPLE reduced the linear swelling of Na-Ben to 62.3% that is nearly 50% less than that of the linear swelling of Na-Ben in water. Consequently, low cost, low environmental footprint, easy availability, improvement in the rheology of WBM, and clay swelling inhibition features make the DPLE a potential contender as a swelling inhibitor for the WBM.

Numerous modifications and variations of the present disclosure are possible in light of the above teachings. It is therefore to be understood that within the scope of the appended claims, the invention may be practiced otherwise than as specifically described herein.

The invention claimed is:

1. A modified bentonite drilling fluid composition, comprising:
   an aqueous base fluid;
   2 to 5 wt. % of a date palm leaves extract (DPLE);
   4 to 8 wt. % of sodium bentonite particles; and
   0.01 to 1 wt. % of a base;
   each wt. % based on a total weight of the drilling fluid composition;
   wherein the DPLE is homogenously disposed on surfaces of the sodium bentonite particles;
   wherein the drilling fluid composition has a pH of about 9;
   wherein the sodium bentonite particles disposed with the DPLE are present in the drilling fluid composition in the form of a composite; and
   wherein a pellet made from the sodium bentonite particles treated with the DPLE has a swelling value at least 75% less than a swelling value of the pellet in an aqueous composition that does not contain the DLPE.

2. The drilling fluid composition of claim 1, wherein the DPLE is prepared from Saudi Arabia date palm tree leaves.

3. The drilling fluid composition of claim 1, wherein the DPLE comprises at least one compound selected from the group consisting of a cellulose compound, a hemicellulose compound, a lignin compound, an extractive substance, and an inorganic salt.

4. The drilling fluid composition of claim 1, wherein the DPLE enhances the hydrophobicity of the sodium bentonite particles after contacting.

5. The drilling fluid composition of claim 1, wherein the base comprises one or more of an alkali hydroxide, an alkali carbonate, an alkali bicarbonate, caustic soda, an alkaline earth metal hydroxide, an alkaline earth metal carbonate, and an alkaline earth bicarbonate.

6. The drilling fluid composition of claim 1, wherein the base is sodium hydroxide.

7. The drilling fluid composition of claim 1, wherein the aqueous base fluid comprises one or more additives selected from the group consisting of an emulsifier, an anti-foaming agent, a fluid-loss additive, a viscosity modifier, a shale stabilizer, an alkali compound, a bridging agent, and a weighting agent.

8. The drilling fluid composition of claim 7, wherein:
the emulsifier is selected from the group consisting of sodium lauryl sulfate (SLS), sodium dodecylbenzene sulfonate (SDBS), polyacrylate, tall oil fatty acid, and fatty amidoamine;
the anti-foaming agent is selected from the group consisting of polydimethylsiloxane, fatty acid ester, silicon dioxide, and vegetable oil;
the viscosity modifier is selected from the group consisting of a clay, a saccharide, a polysaccharide, a cellulose, an acrylate polymer and copolymer, and a polyvinyl polymer and copolymer;
the fluid-loss additive is selected from the group consisting of a starch, a starch derivative, a cellulose, and a cellulose derivative;
the shale stabilizer is selected from the group consisting of a sodium salt, and a sulfonated asphalt;
the alkali compound is selected from the group consisting of caustic soda and soda ash;
the bridging agent is selected from the group consisting of sodium borate, boric oxide, calcium carbonate, and magnesium oxide; and
the weighting agent is selected from the group consisting of barite and hematite.

9. The drilling fluid composition of claim 1, having a capillary suction time in a range of 50 to 500 seconds.

10. The drilling fluid composition of claim 1, having a zeta potential in a range of −50 to −5 millivolts (mV).

11. The drilling fluid composition of claim 1, having a fluid loss in a range of 5 to 20 milliliters (mL) according to ASTM D5891.

12. A method of making the drilling fluid composition of claim 1, comprising:
preparing a date palm leaves extract (DPLE) composition containing the DPLE by:
washing date palm leaves and drying to form cleaned date palm leaves;
wherein the date palm leaves are Saudi Arabia date palm tree leaves;
grinding the cleaned date palm leaves and heating in water at a temperature of at least 50° C. to form a first mixture; and
filtering the mixture to form a filtrate containing the DPLE; and
adjusting a concentration of the filtrate with water to form the DPLE composition;
wherein the DPLE composition comprises 0.5 to 50 wt. % of the DPLE.

13. The method of claim 12, wherein the date palm leaves comprise 5 to 15 wt. % ash, 30 to 50 wt. % cellulose, 5 to 15 wt. % hemicellulose, 20 to 40 wt. % lignin, and 1 to 10 wt. % extractive, each wt. % based on a total weight of the date palm leaves.

14. The method of claim 12, further comprising:
dispersing the sodium bentonite particles in the aqueous base fluid to form a suspension;
mixing the date palm leaves extract (DPLE) composition containing the DPLE with the dispersion to form a second mixture; and
adjusting the pH of the mixture by adding the base and mixing to form the drilling fluid composition.

15. A method of drilling a subterranean geological formation, comprising:
drilling the subterranean geological formation to form a wellbore therein;
injecting the drilling fluid composition of claim 1 into the wellbore during the drilling and circulating the drilling fluid composition in the wellbore; and
recovering a product stream from the subterranean geological formation.

16. The method of claim 15, wherein the wellbore is at least one of a vertical wellbore, a deviated wellbore, a multilateral wellbore, and a horizontal wellbore.

17. The method of claim 15, wherein the subterranean geological formation comprises at least one selected from the group consisting of a shale formation, a tar sands formation, a coal formation, a clay formation, and a conventional hydrocarbon formation.

* * * * *